United States Patent [19]

Kumagai et al.

[11] Patent Number: 5,612,818
[45] Date of Patent: Mar. 18, 1997

[54] CONFOCAL MICROSCOPE

[75] Inventors: Satoru Kumagai, Chigasaki; Hiroshi Ohki, Yokohama, both of Japan

[73] Assignee: Nikon Corporation, Tokyo, Japan

[21] Appl. No.: 301,899

[22] Filed: Sep. 7, 1994

[30] Foreign Application Priority Data

| Sep. 8, 1993 | [JP] | Japan | 5-246053 |
| Dec. 27, 1993 | [JP] | Japan | 5-348840 |
| Jul. 12, 1994 | [JP] | Japan | 6-181961 |

[51] Int. Cl.$^6$ ................ G02B 21/06
[52] U.S. Cl. ............ 359/385; 359/386; 359/740
[58] Field of Search .................. 359/368, 385, 359/386, 387, 388, 389, 232, 634, 738, 739, 740

[56] References Cited

U.S. PATENT DOCUMENTS

| 4,884,881 | 12/1989 | Lichtman et al. | 359/389 |
| 5,004,321 | 4/1991 | Feldman et al. | 359/368 |
| 5,162,941 | 11/1992 | Favro et al. | 359/368 |

Primary Examiner—Timothy P. Callahan
Assistant Examiner—Jung Ho Kim
Attorney, Agent, or Firm—Keck, Mahin & Cate

[57] ABSTRACT

A confocal microscope is adapted to prevent a shading phenomenon of an observation image due to axial chromatic aberration and chromatic aberration of magnification of an objective optical system. A backward light from a specimen illuminated by an excitation light through the objective optical system is condensed through the objective optical system and a deflecting optical system at a position conjugate to the condensing point on the specimen. Formed in a light shielding member aligned with the condensing point position of the backward light is a pinhole having an opening which substantially covers a range of movements of the condensing point of the backward light caused as a result of the movement of the optical path by the deflecting optical system. Alternatively, in order to reduce the amount of movement of the condensing point corresponding to the wavelength of the backward light to zero, a light deflecting element is arranged at a position displaced by a predetermined distance from a deflecting optical system-side focal position of the objective optical system or a position conjugate to the focal position.

7 Claims, 10 Drawing Sheets

PRIOR ART
Fig. 7
Fig. 10
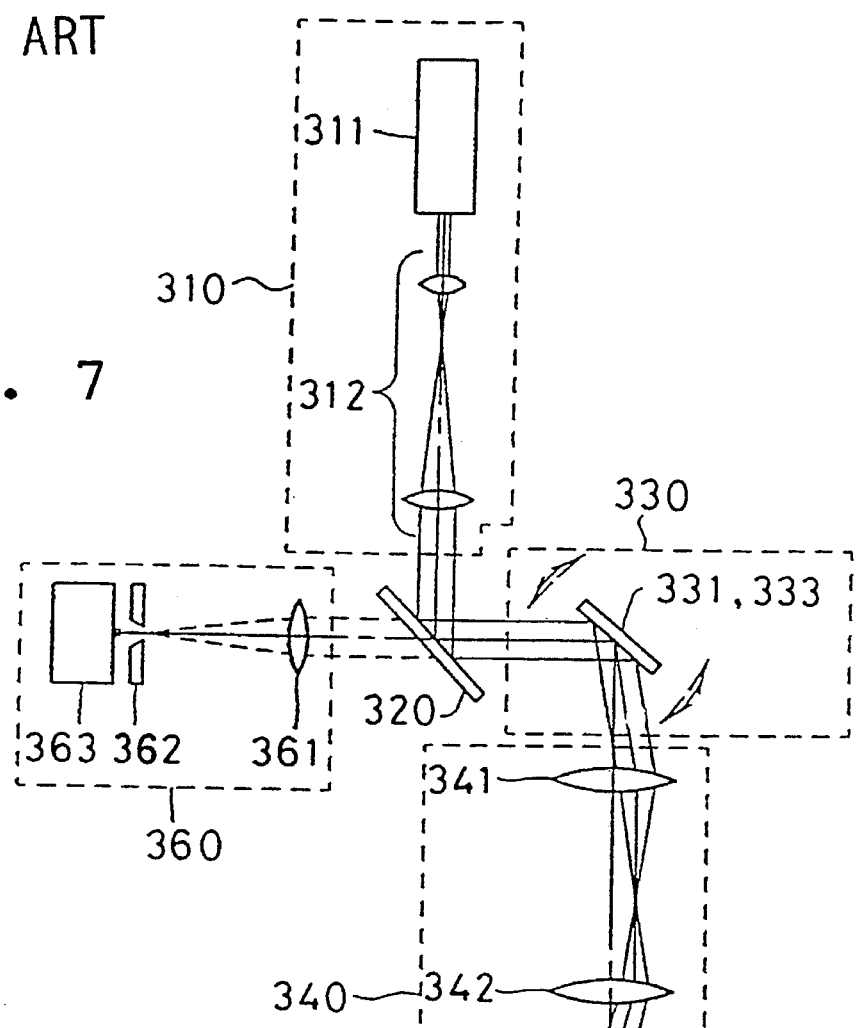
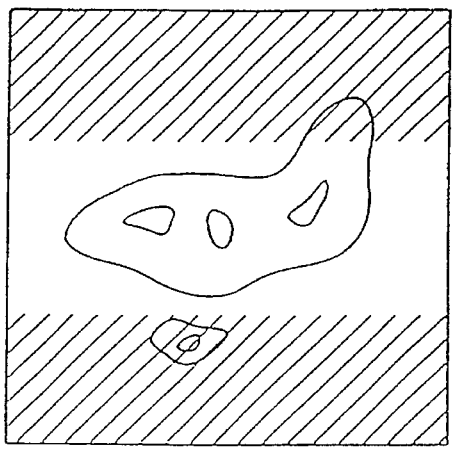

PRIOR ART
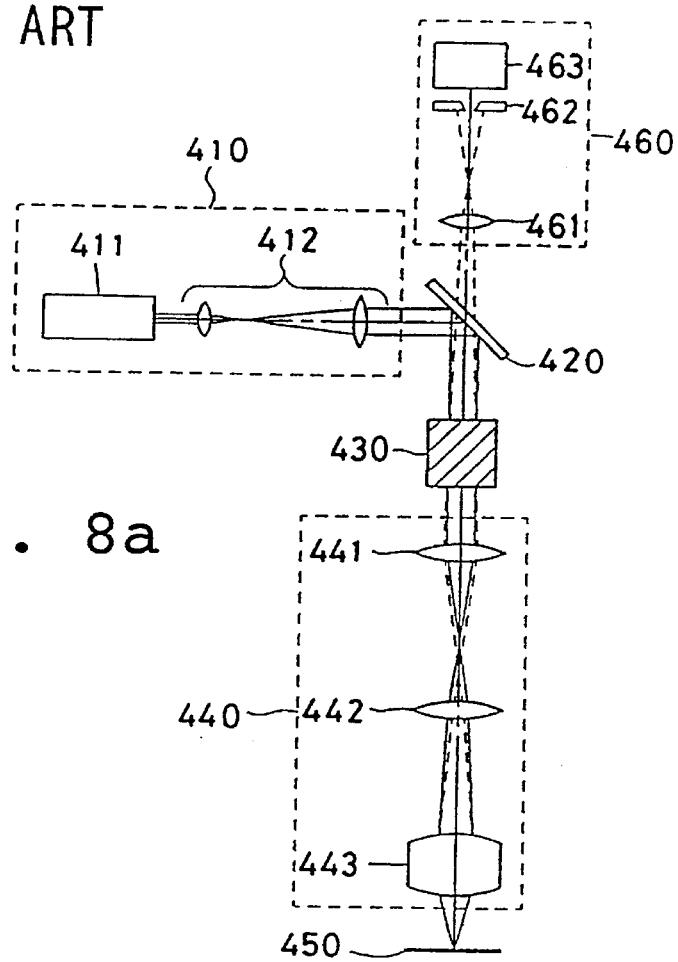
Fig. 8a
Fig. 8b
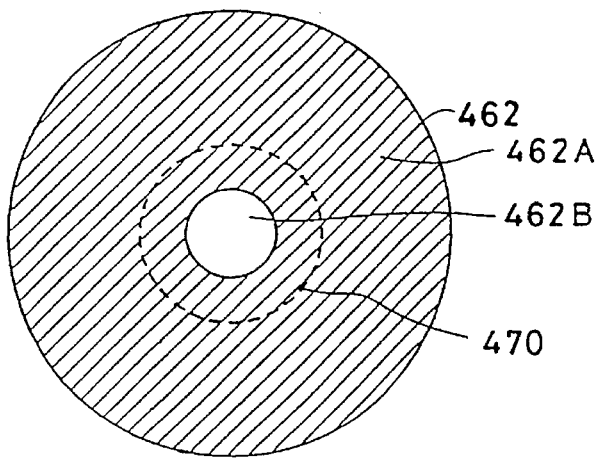
Fig. 8c
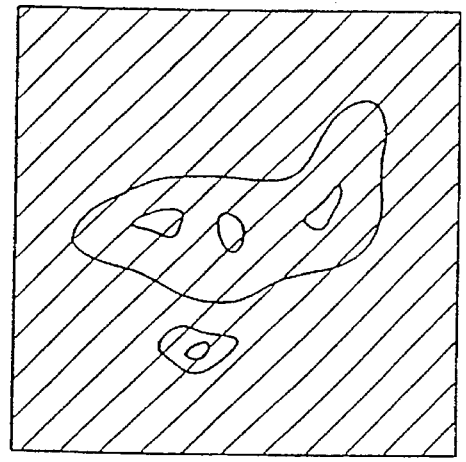

PRIOR ART
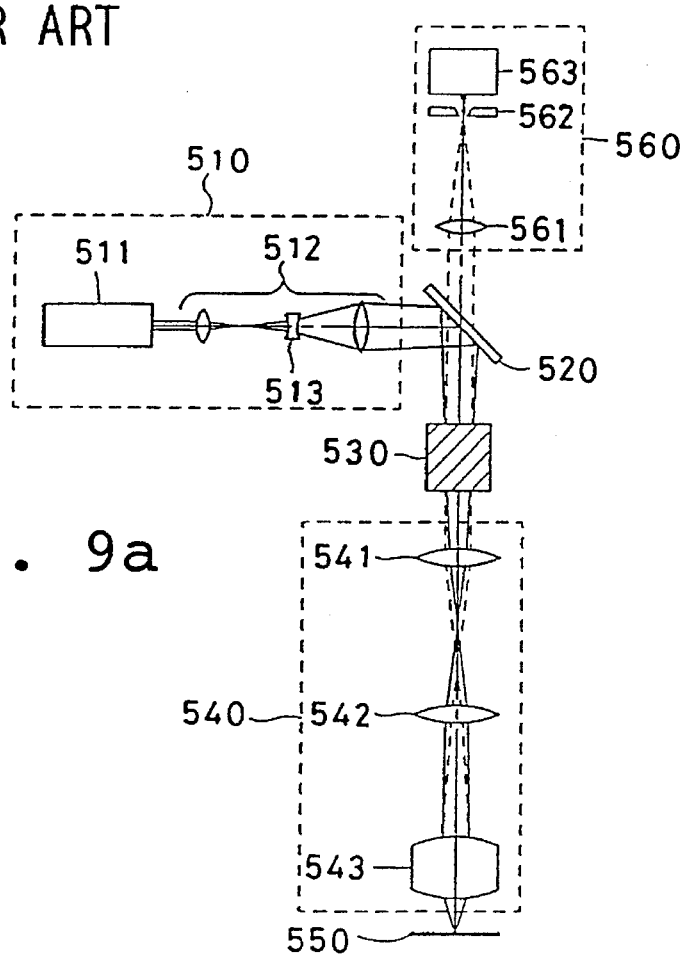
Fig. 9a
Fig. 9b
Fig. 9c
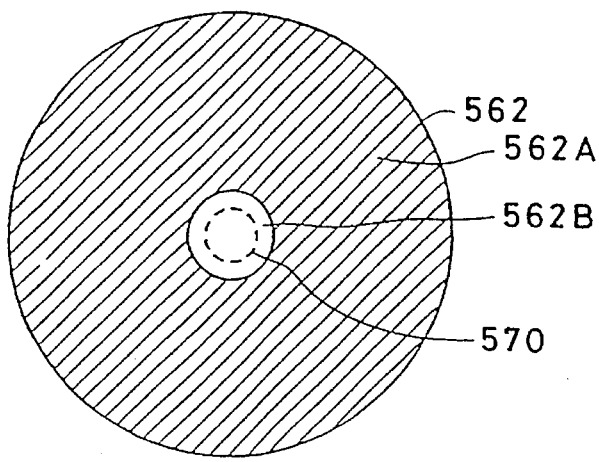
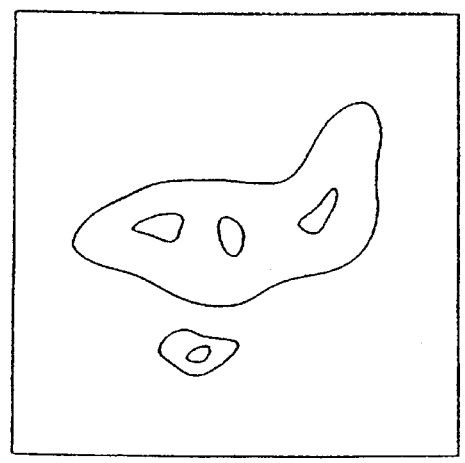

PRIOR ART
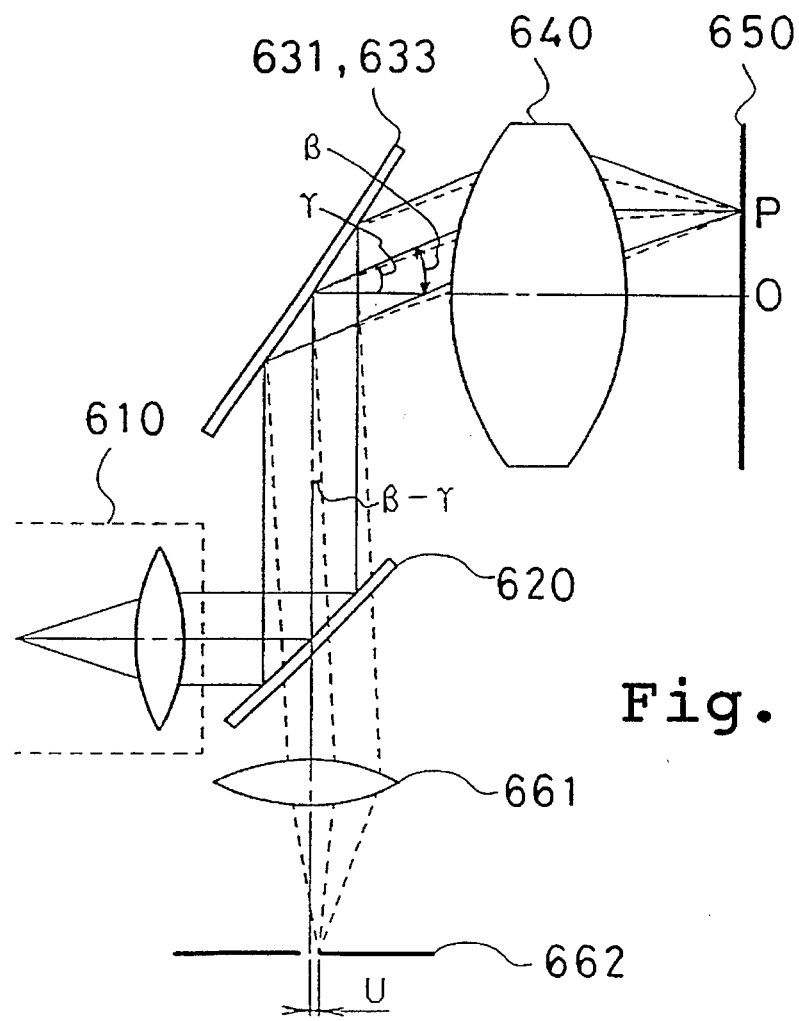
Fig. 11a
Fig. 11b
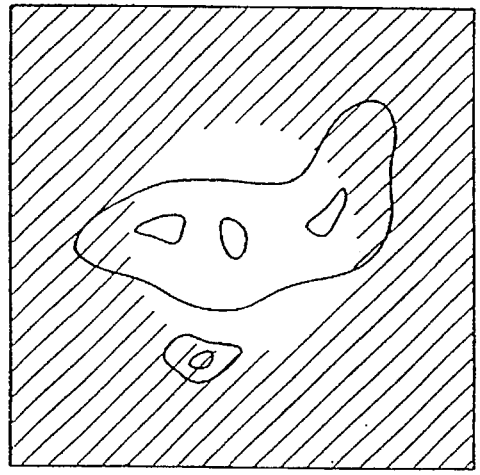

PRIOR ART
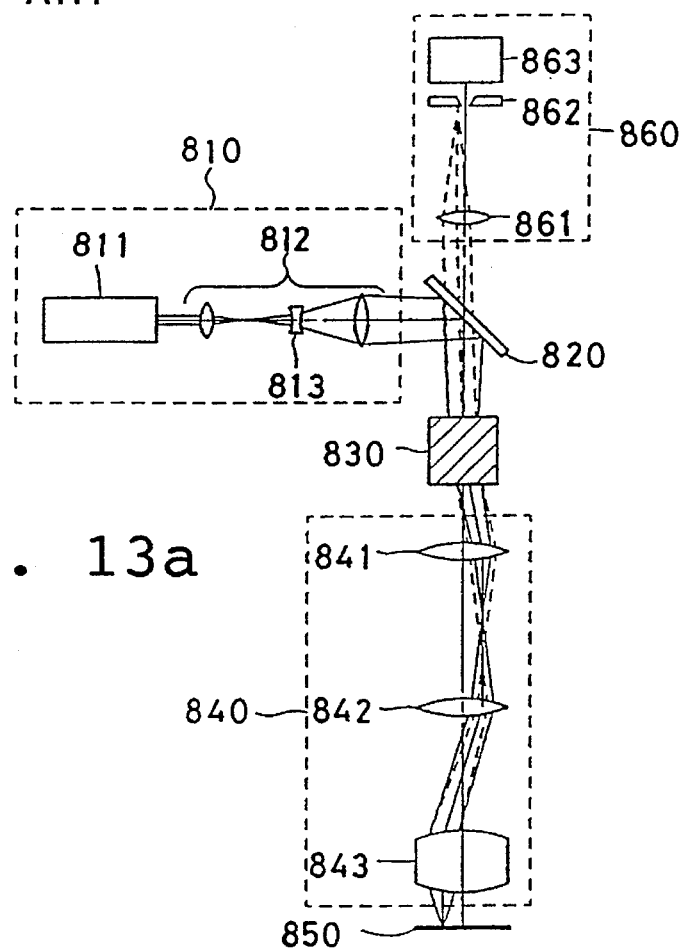
Fig. 13a
Fig. 13b
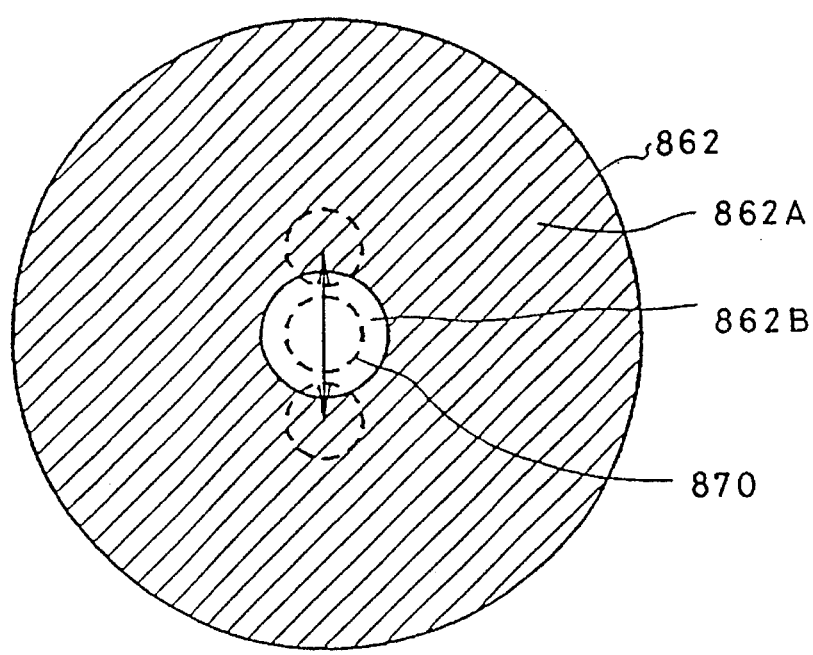

CONFOCAL MICROSCOPE

BACKGROUND OF THE INVENTION

1. Field of the Invention

The present invention relates to a confocal microscope used for the observation of a specimen, e.g., a biological specimen.

2. Related Background Art

Generally, conventional confocal microscopes have been so constructed that the light beam emitted from a light source is condensed on a specimen and the backward light from the specimen irradiated by the condensed light spot is selectively detected through a light shielding member with a pinhole arranged at a position conjugate to the specimen, thereby producing image information. Such light shielding member is composed of a thin sheet of metal or a thin film of metal evaporated on the surface of a transparent substrate to shield undesired components in the backward light and a pinhole is formed at the required location of the light shielding member.

The features of the confocal microscope reside in that when projecting the light beam emitted from the light source on the specimen and detecting the backward light from the specimen, such undesired light beams as the return beam from around the condensed light spot on the specimen, the return beam from the out-of-focus portions, etc., are shielded by the light shielding member with a pinhole and therefore any undesired blurred image is prevented from superposing on the periphery of an image of the scanning condensing point.

Generally, among the confocal microscopes, the scanning-type fluorescent confocal microscope or the confocal microscope in which the laser-beam from a light source unit is projected as an excitation light on a specimen and the fluorescence produced from the specimen due to the excitation light is detected, has an excellent resolution along the optical axis direction.

This is an important feature which is not possessed by the ordinary fluorescent microscopes and this is extremely useful in the fields of medical science and biology where cells, biological tissues, etc., must be observed stereoscopically. In addition, by reducing the size of the pinhole of the light shielding member, it is possible to ensure more improved resolution along the optical axis.

Then, with the scanning-type confocal microscope employing fluorescence, as in the case where the excitation light is ultraviolet light and the backward beam is a visible light, for example, the excitation light and the backward beam differ in wavelength from each other and thus there is the danger of the objective lens showing an axial chromatic aberration and an aberration of magnification.

While it is possible to solve, by the use, for example, of a corrector lens, the defocusing problem of the backward light on the light shielding plate, in the case where the objective optical system having an axial chromatic aberration is used, when the correction is provided in this way, if the light deflecting element of the deflecting optical system for specimen scanning purposes is not arranged at the pupil position, a shading phenomenon is caused in which only the central portion of the observation image becomes bright in rectangular form and the other portions become dark. If the degree of this shading is extremely high, the peripheral portion of the observation image becomes dark completely and it cannot be observed.

Also, where the objective optical system shows a chromatic aberration of magnification, the shading is caused in the similar manner. In this case, a condition is caused in which the peripheral portion of the visual field becomes dark in circular form irrespective of the arrangement of the light deflecting element, and moreover the periphery of the observation image becomes dark completely and cannot be observed as in the case of the axial chromatic aberration if the degree of the shading is extremely high.

For instance, in the case of the confocal microscope utilizing the fluorescent wavelength, the excitation light or the projection light and the fluorescence of the backward beam to be detected differ in wavelength from each other. This is true not only with the fluorescent microscope but also with the confocal microscope in which the backward light of different wavelengths other than the reflected light are directly detected.

Thus, where a lens of a large chromatic aberration of magnification is used in the objective optical system, if the backward light from a specimen is condensed through the objective optical system and the deflecting optical system at a position conjugate to the condensing point on the specimen, there is the danger of the position of the condensing point of the backward light deviating from the pinhole position on the light shielding member.

Thus, there are instances where, of the fluorescence emitted from the condensed light spot portion on the specimen, some components condensed on the positions deviating from the pinhole are intercepted by the light shielding member thus failing to reach the detection system. In such a case, a shading phenomenon is caused in which the light quantity of the fluorescence detected is decreased and the peripheral portion of the observation image becomes dark in circular form.

Such shading not only deteriorates the indication condition of the observation image but also gives rise to a problem in that the measurement accuracy is deteriorated extremely in cases where the amount of calcium ions or the like is measured by means of the emitted (detected) fluorescent wavelength.

Such shading due to the chromatic aberration of magnification cannot be overcome unless the chromatic aberration of magnification is satisfactorily corrected within the objective optical system or the pinhole diameter of the light shielding member is increased considerably.

However, the former is disadvantageous in that such correction is extremely difficult from the optical designing point of view and also the selection of a lens free of such chromatic aberration of magnification, if any, causes an enormous increase in the production cost. On the other hand, the latter causes an undesired result of ruining the important feature of the confocal microscope, i.e., the resolution along the optical axis direction.

SUMMARY OF THE INVENTION

It is the primary object of the present invention to provide a confocal microscope so designed that even if an objective optical system showing an axial chromatic aberration or a chromatic aberration of magnification is used, an excellent observation image can be produced without causing such shading as mentioned previously.

In accordance with an aspect of the present invention there is thus provided a confocal microscope adapted for the purpose of observing a specimen such as a biological specimen, and the confocal microscope includes a light source for producing an excitation light of a predetermined wavelength, a deflecting optical system for deflecting the optical path of the excitation light from the light source, an objective optical system for condensing the deflected excitation light on a specimen, a condensing lens group whereby the backward light from the specimen illuminated by the excitation light is condensed through the objective optical system and the deflecting optical system at a position conjugate to the condensing point on the specimen, a light shielding member having a pinhole aligned with the condensing point position of the backward light, and a detection system for detecting the backward light through the pinhole of the light shielding member, the opening of the pinhole in the light shielding member being of such size that it substantially covers a range of movement of the condensing point of the backward light caused by the movement of the optical path due to the deflecting optical system.

With a confocal microscope according to a preferred modified aspect of the present invention, the pinhole has a slit-like opening shape.

In accordance with still another preferred aspect of the present invention there is provided a confocal microscope including a light source for producing an excitation light of a predetermined wavelength, a deflecting optical system including a light deflecting element for deflecting the optical path of the excitation light from the light source, an objective optical system for condensing the deflected excitation light on a specimen, a condensing lens group whereby the backward light from the specimen illuminated by the excitation light is condensed through the objective optical system and the deflecting optical system at a position conjugate to the condensing point on the specimen, a light shielding member having a pinhole aligned with the condensing point position of the backward light, and a detection system for detecting the backward light through the pinhole of the light shielding member, and wherein the opening length P of the pinhole with respect to the deflecting direction of the light deflecting element is selected so as to satisfy the following equation (1)

$$P \geq \left| \frac{(\{1-(N/L)\}-(F/G)\{1-(M/K)\}H\alpha}{\{1-(N/L)+(S/L)\}} \right| \quad (1)$$

Here, G is the focal length of the objective optical system due to the wavelength of the backward light, F the focal length of the objective optical system due to the wavelength of the excitation light, L the distance between the light deflecting element-side focal plane of the objective optical system due to the backward light wavelength and the conjugate plane to the specimen surface, K the distance between the light deflecting element-side focal plane of the objective optical system due to the excitation light wavelength and the conjugate plane to the specimen surface, N the distance between the light deflecting element-side focal point of the objective optical system due to the backward light wavelength and the position of the deflection plane of the light deflecting element on the optical axis, M the distance between the light deflecting element-side focal point of the objective optical system due to the excitation light wavelength and the position of the deflection plane of the light deflecting element on the optical axis, S the distance between the light deflecting element-side focal point of the condensing lens group and the position of the deflection plane of the light deflecting element on the optical axis, H the focal length of the condensing lens group due to the backward light wavelength, and $\alpha$ the beam deflection angle of the light deflecting element.

In this case, it is assumed that L and K are positive when the conjugate plane is on the opposite side to the objective optical system with respect to the focal plane and they are negative when the conjugate plane is on the same side, and that N, M and S are positive when the deflection plane position on the optical axis is on the opposite side to the objective optical system with respect to the focal point and they are negative when the deflection plane position is on the same side.

Also, in accordance with still another preferred modified aspect of the present invention the confocal microscope is so designed that with D representing the Airy disc diameter of the backward light on the light shielding member, the opening length P of the pinhole with respect to the deflecting direction of the light deflecting element is selected so as to satisfy the following equation (2)

$$P \leq \left| \frac{(\{1-(N/L)\}-(F/G)\{1-(M/K)\}H\alpha}{\{1-(N/L)+(S/L)\}} \right| + D \quad (2)$$

In accordance with another aspect of the present invention there is provided a confocal microscope adapted for the observation of a specimen such as a biological specimen, and the confocal microscope includes a light source for producing an excitation light of a predetermined wavelength, a deflecting optical system for deflecting the optical path of the excitation light from the light source, an objective optical system for condensing the deflected excitation light on a specimen, a condensing lens group whereby the backward light from the specimen illuminated by the excitation light is condensed through the objective optical system and the deflecting optical system at a position conjugate to the condensing point on the specimen, a light shielding member having a pinhole aligned with the condensing point position of the backward light, and a detection system for detecting the backward light through the pinhole of the light shielding member. The deflecting optical system includes an optical deflecting element for deflecting the optical path, and the optical deflecting element is arranged at a position displaced by a predetermined distance from the deflecting optical system-side focal position of the objective optical system or a position conjugate to the focal position.

In accordance with a preferred modified aspect of the present invention the confocal microscope is so designed that the distance N between the light deflecting element-side focal point of the objective optical system due to the backward light wavelength or a conjugate point thereto and the position of the deflection plane of the light deflecting element on the optical axis is determined so as to satisfy the following equation (3)

$$N = \frac{G-F\{1+(\Delta/K)\}}{(G/L)-(F/K)} \quad (3)$$

whereby represented by $\Delta$ is the optical axial distance between the light deflecting element-side focal plane of the objective optical system due to the excitation light wavelength or a conjugate plane thereto and the light deflecting element-side focal plane of the objective optical system due to the backward light or a conjugate plane thereto and this $\Delta$ corresponds to the difference (=N–M) between the distance N and the distance M.

In accordance with another preferred modified aspect of the present invention the confocal microscope is so designed that the deflecting optical system includes a first light deflecting element and a second light deflecting element whereby the first light deflecting element is displaced from the deflecting optical system-side focal position of the objective optical system and the second light deflecting element is displaced from a position conjugate to the deflecting optical system-side focal position of the objective optical system.

In accordance with still another preferred modified aspect of the present invention the confocal microscope further includes displacement mechanisms whereby the deflecting optical system displaces the optical deflecting elements along the optical axis.

The above and other objects, features and advantages of the present invention will become more apparent from the following description of some embodiments simply shown for illustrative purposes without any intention of limiting the technical scope of the present invention when the taken in conjunction with the accompanying drawings.

DESCRIPTION OF THE DRAWINGS

FIG. 7 shows schmatically the construction of a conventional confocal microscope employing a galvanometer mirror for a deflecting optical system.

FIG. 8a is an optical path diagram showing the condensing principle of the excitation light and the backward light (fluorescence) in the case where the objective lens group of the conventional confocal microscope has an axial chromatic aberration FIG. 8b shows the positional relation between the light shielding plate with a pinhole and the backward light (fluorescence) spot as viewed from the objective optical system side in the case of FIG. 8a, and FIG. 8c shows the resulting observation image in the case of FIG. 8b.

FIG. 9a is an optical path diagram showing the condensing principle of the excitation light and the backward light (fluorescence) in the case where the objective lens group is corrected for the axial chromatic aberration in the conventional confocal microscope. FIG. 9b shows the positional relation between the light shielding plate with a pinhole and the backward light (fluorescence) spot as viewed from the objective optical system side in the case of FIG. 9a and FIG. 9c shows schematically the resulting observation image in the case of FIG. 9b.

FIG. 10 shows schematically the resulting observation image in the case where correction is provided for the axial chromatic aberration of the objective optical system in the confocal microscope but the light deflecting element is deviated from the pupil position.

FIG. 11a is an optical path diagram showing the condensing principle of the excitation light and the backward light (fluorescence) in the case of a scanning-type confocal microscope in which the objective optical system has only a chromatic aberration of magnification and the deflection angle θ of the deflecting optical system is θ≠0, and FIG. 11b shows schematically the resulting observation image in the case of FIG. 11a.

FIG. 13a an optical path diagram showing by way of principle the case of a fluorescent confocal microscope in which the axial chromatic aberration of the objective lens group is corrected but the light deflecting element is deviated from the pupil position, and FIG. 13b shows the positional relation between the light shielding plate with a pinhole and the backward light (fluorescence) as looked from the objective optical system side in the case of FIG. 13a.

DESCRIPTION OF THE PREFERRED EMBODIMENTS

In order to facilitate the understanding of the principle of the present invention, a conventional confocal microscope will now be described with reference to FIG. 4 before explaining the embodiments of the present invention.

Figure 4:
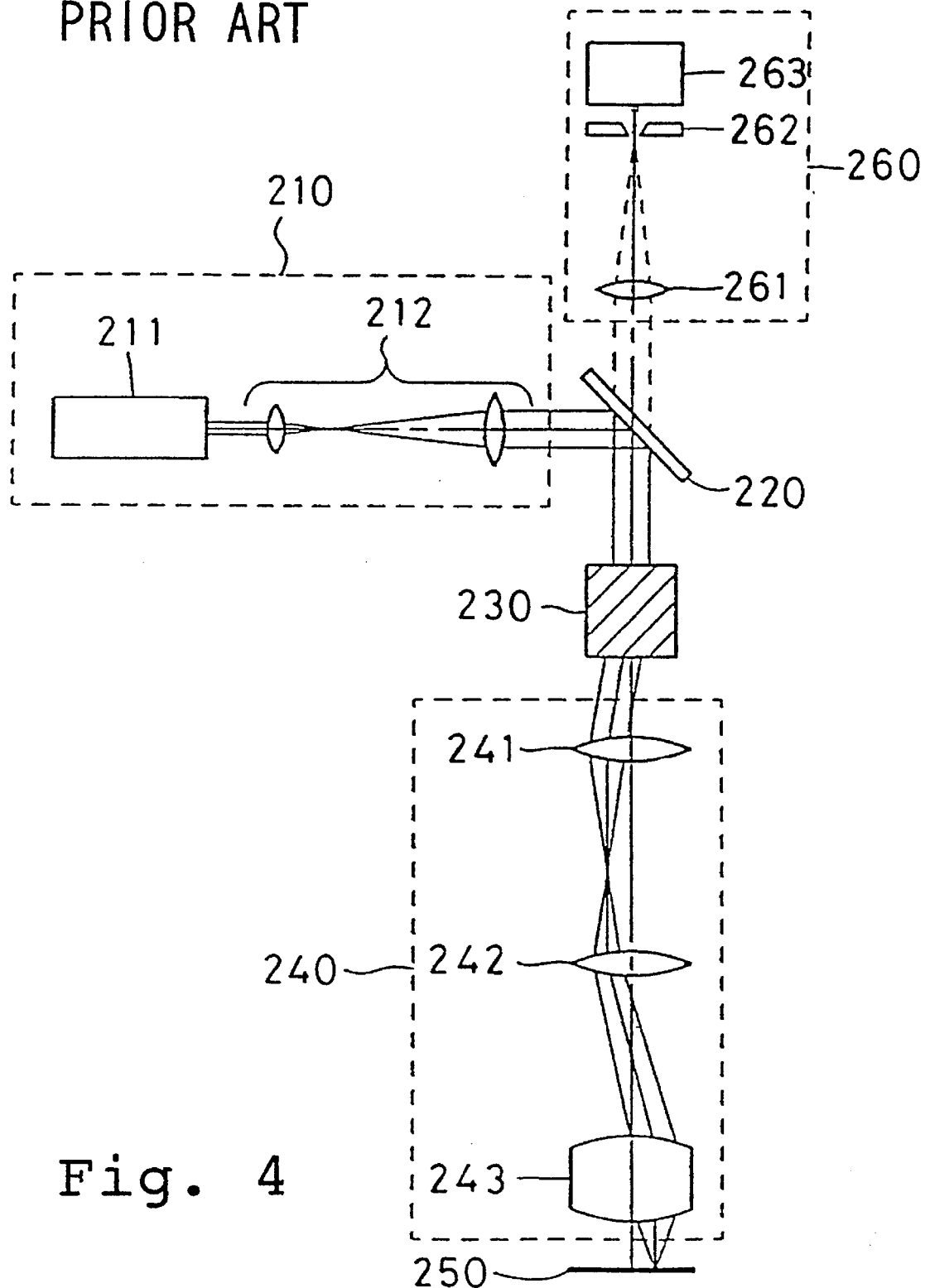
FIG. 4 shows schematically the construction of a conventional confocal microscope.

The conventional confocal microscope shown in FIG. 4 is mainly comprised of a light source unit 210, a beam splitter 220, a deflecting optical system 230, an objective optical system 240 and a detection system 260.

The laser beam, shown by the solid lines in FIG. 4, is emitted from the light source unit 210 including a laser light source 211 and a beam expander 212 and then it is reflected by the beam splitter 220 to fall on the deflecting optical system 230 including at least one light deflector.

The beam splitter 220 reflects and directs the laser beam emitted from the light source unit 210 along the bent optical path to the deflecting optical system 230 and it also serves the role of optical path dividing means which transmits and directs the backward beam from a specimen to the detection system. Since this example supposes a fluorescent microscope which detects fluorescence, the beam splitter 220 is comprised of a dichroic mirror for separating the excitation light (laser beam) and the backward light (fluorescent light).

The laser beam directed to the deflecting optical system 230 by the beam splitter 220 is first deflected by the light deflecting element included in the deflecting optical system 230 in each of the horizontal and vertical directions (with respect to the plane of the paper in the Figure) by an arbitrary amount and it is then condensed and projected in spot form on a specimen 250 through the objective optical system 240.

While the condensed light spot two-dimensionally scans over the specimen 250 in accordance with the amounts (variable) of the horizontal and vertical deflections by the deflecting optical system 230, at this time the reflected light, fluorescent radiation, Raman scattered light and the like are produced as the backward light from the specimen 250 due to the projection of the condensed light spot and the detection light emitted from the specimen 250 results in two-dimensional (image) information.

This backward light again enters the objective optical system 240 through paths reverse to those through which the laser beam emitted from the light source unit 210 entered the objective optical system 240. Then, the backward light beam enters the deflecting optical system 230 so that it is directed into the optical path (not deflected) along the optical axis.

Of the backward light, the fluorescence, etc., are transmitted through the beam splitter 220 so that the fluorescence, etc., are separated from the other backward light and entered as detection light into the detection system 260. In this system, the detection light is condensed at a position conjugate to the condensing point on the specimen through the condensing lens group 261 and only the light beam transmitted through a light shielding plate 262 with a pinhole is entered as the detection light into a photodetector 263.

While the backward light beam entering into the detection system 260 forms a light spot at the pinhole position on the light shielding plate 262 which is at the conjugate position to the specimen 250 through the condensing lens group 261, at this time the undesired backward light components are not condensed at the pinhole position but removed by the light shielding plate and only the required backward light component of the image of the scanning point is selectively passed through the pinhole.

The light passed through the pinhole (i.e., the required fluorescent component of the backward light) is converted into an electric signal by the photodetector 263 and it is further subjected to image processing so as to be displayed as a clear image of the specimen 250.

The deflecting optical system 230 includes two light deflecting elements for the purpose of horizontal scanning and vertical scanning, respectively, and the below-mentioned two systems, i.e., a focal point relay arrangement system and a focal point adjoining arrangement system are known as the arrangement systems for the two light deflecting elements.

Figure 5:
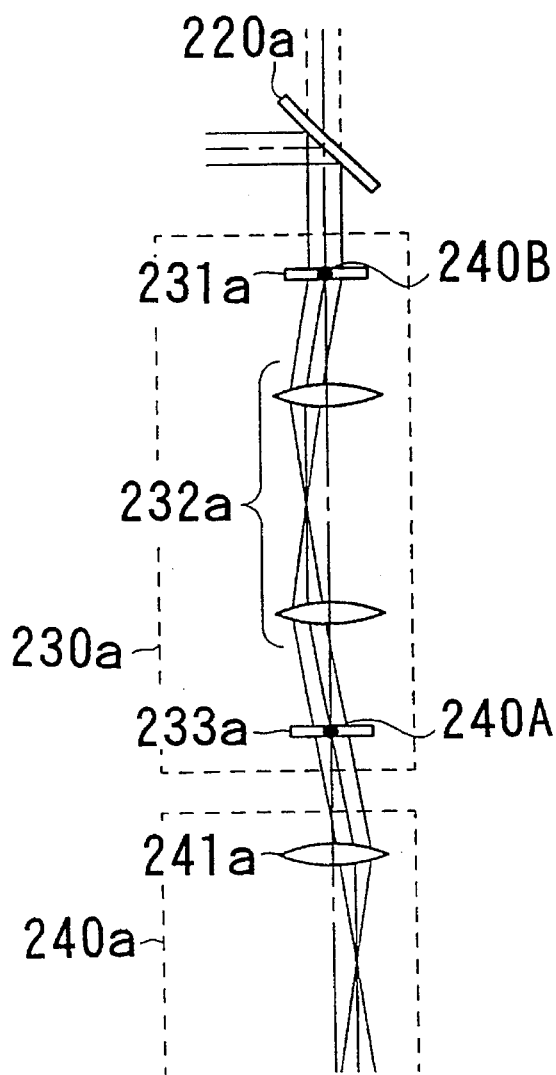
FIG. 5 shows schematically the construction of the light deflecting unit of the focal point relay arrangement system employed in the deflecting optical system of the conventional confocal microscope.

FIG. 5 shows an example of the focal point relay arrangement system. A deflecting optical system 230a of this arrangement system includes two light deflecting elements 231a and 233a which are respectively arranged at a light deflecting optical system-side focal position 240A of an objective optical system 240a and a conjugate position 240B thereto.

As shown in the Figure, the light deflecting optical system 230a is provided with the optical path deflecting elements 231b and 233b for the purpose of horizontal scanning and vertical scanning to effect a two-dimensional scanning over a specimen and a relay optical system 232a is arranged between the optical path deflecting elements 231a and 233a.

In other words, while one of the two elements or the first optical path deflecting element 233a is arranged at the light deflecting optical system-side focal position 240A of the objective optical system 240a and the other element or the second optical path deflecting element 231a is arranged at the position 240B, the position 240B is a position conjugate to the light deflecting optical system-side focal position 240A of the objective optical system 240a through the relay optical system 232a.

By virtue of these first and second optical path deflecting elements 231a and 233a, the optical path of the light beam entered into the light deflecting optical system 230a through a beam splitter 220a is deflected in both the horizontal direction and the vertical direction and the condensed light spot is moved thereby scanning over the specimen by the path of this movement, whereas the optical path of the backward light (detection light) entered into the light deflecting optical system 230a through the objective optical system 240a is deflected in both the horizontal direction and the vertical direction and converted into a light beam which is not deflected with respect to the optical axis (i.e., a light beam along the optical axis).

Figure 6:
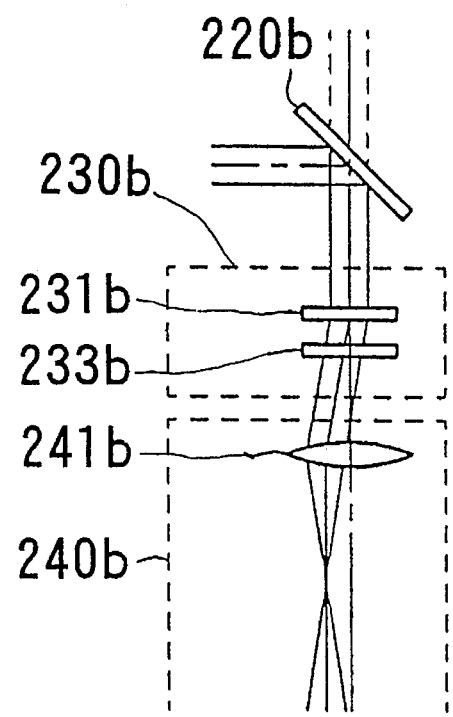
FIG. 6 shows schematically the construction of the light deflecting unit of the focal point adjoining arrangement system used in the deflecting optical system in the conventional confocal microscope.

FIG. 6 shows an example of the focal point adjoining arrangement system. In a deflecting optical system 230b of this arrangement system, two light deflecting elements 231b and 233b are arranged adjacent to the deflecting optical system-side focal position of a scanning optical system 240b and this focal point adjoining arrangement system is actually used in many cases owing to its advantage of the whole optical system being simplified and reduced in size as will be seen from the Figure.

Further, FIG. 7 shows the schematic construction of a confocal microscope employing galvanometer mirrors as other light deflecting elements. However, only the single light deflecting element is depicted in FIG. 7 for purposes of simplification. While other elements of the type utilizing the reflection of light, e.g., polygonal mirrors may be used for such light deflecting elements in addition to the galvanometer mirrors, in the case of these light deflecting elements utilizing the reflection of light the deflection angle is constant irrespective of the wavelength and thus there is the advantage of being easy to use.

Then, with a scanning-type confocal microscope employing fluorescence, as in the case where the excitation light is ultra-violet light and the backward light beam is visible light, for example, the excitation light and the backward light beam differ in wavelength from each other and thus there are cases where the objective lens shows both axial chromatic aberration and chromatic aberration of magnification.

For instance, FIG. 8a shows the conditions of excitation light and fluorescence in the case where an objective lens group having for example an axial chromatic aberration is used in a scanning-type fluorescent confocal microscope. It is to be noted that in FIG. 8a the excitation light is indicated by the solid lines and the fluorescence is indicated by the broken lines.

In FIG. 8a, the excitation light emitted from a light source unit 410 is reflected by a dichroic mirror 420, passed through a deflecting optical system 430 and an objective optical system 440 and condensed on a specimen 450. The fluorescence emitted from the specimen 450 is passed through the objective optical system 440, the deflecting optical system 430 and the dichroic mirror 420 and condensed by a condensing lens group 461 to form a light spot.

Since the objective lens showing the axial chromatic aberration is used, the degree of convergence or divergence of the fluorescence differs from that of the excitation light and the light beam condensed into a spot form is widely spread on a light shielding plate 462 as shown in FIG. 8b. The light spot 470 shown by the broken line in FIG. 8b is extended into a light shielding portion 462A of the light shielding plate 462 which is indicated by the hatching.

The state of the resulting observation image is schematically shown in FIG. 8c. Since the fluorescence reaching a photodetector 463 through a pinhole 462B of the light shielding plate 462 is a part of the fluorescence emitted from the specimen 450 and consequently the light quantity detected is decreased, it is only possible to obtain a dark image of the specimen 450 as a hole.

In order to prevent any decrease in the light quantity due to the axial chromatic aberration, it is necessary to correct the axial chromatic aberration of the objective optical system in any other portion than the optical system. To attain this purpose in the easiest way, it is only necessary that as shown in FIG. 9a, an axial chromatic aberration corrector lens 513 is arranged between a laser light source 511 and a dichroic mirror 520 or between the dichroic mirror 520 and a light shielding plate 562 thereby providing correction such that the fluorescence emerging from a specimen 550 is condensed on the light shielding plate.

FIG. 9b shows the resulting light spot 570 of the fluorescence on the light shielding plate as looked from the side of a condensing lens group 561. In the Figure, the light spot 570 of the fluorescence indicated by the broken line is condensed into such a tiny spot which can be entirely introduced into a pinhole 562B of the light shielding plate 562. As a result, the large part of the fluorescence emitted from the specimen 550 reaches a photodetector 563 through the pinhole 562B of the light shielding plate 562 so that there is no decrease in the light quantity to be detected and a clear observation image of the specimen 550 can be obtained as shown in FIG. 9c.

While it is thus possible to solve the problem of defocusing of the backward light on the light shielding plate by the use of the corrector lens in the case of using the objective optical system having the axial chromatic aberration, the provision of such correction results in the occurrence of a shading phenomenon in which if the light deflecting element is not arranged at the pupil position, the central portion of the resulting observation image becomes bright in rectangular form and the remaining portion becomes dark as shown in FIG. 10. If this shading is intense, the peripheral portion of the image becomes completely dark thus making the observation impossible.

Also, where the objective optical system has a chromatic aberration of magnification, similarly the shading is caused. In this case, a situation arises in which the peripheral portion of the visual field becomes dark in circular form irrespective of the arrangement of the light deflecting element, whereas if the shading is more intense, the periphery of the observation image becomes completely dark as in the case showing the axial chromatic aberration, thereby making the observation impossible.

Now briefly explaining the principle of the occurrence of shading due to the chromatic aberration of magnification when detecting the backward light different in wavelength from the excitation light in the fluorescent confocal microscope by way of example, FIG. 11a shows the principle of the condensing of the excitation light and the fluorescence in the case where use is made of an objective optical system having a chromatic aberration of magnification, and here it is assumed for the purpose of simplifying the explanation that the objective optical system is free of the axial chromatic aberration and only the chromatic aberration of magnification is present. In the figure, the solid lines indicate the excitation light (laser beam) emitted from a light source unit 610 and the broken lines indicate the fluorescence in the backward light emanated from a specimen.

Also, light deflecting elements 631 and 633 forming a deflecting optical system are respectively arranged at the deflecting optical system-side focal position of an objective optical system 640 and a position conjugate to the said focal position and also each of these elements is arranged so as to maintain an arbitrary angle with respect to the optical axis. It is to be noted that in the Figure only one of the light deflecting elements is illustrated for the purpose of simplifying the explanation.

In FIG. 11a, the excitation light emitted from the light source 610 is reflected by a dichroic mirror 620 and directed to the deflecting optical system. The dichroic mirror 620 functions so that the excitation light (laser beam) from the light source unit 610 is reflected and directed to the light deflecting elements 631 and 633 within the deflecting optical system and also the backward light (fluorescence) emitted from a specimen 650 is transmitted and directed to a condensing lens group 661 within a detection system.

On the other hand, the excitation light directed to the deflecting optical system by the dichroic mirror 620 has its optical path deflected in the horizontal direction in the vertical direction by the light deflecting elements 631 and 633 which are each arrange within the deflecting optical system with a variable angle of arrangement and then directed to and condensed by the objective optical system thus irradiating over the specimen 650 by the condensed light spot. This condensed light spot is moved in response to the amounts of deflection by the light deflecting elements 631 and 633 thereby two-dimensionally scanning over the specimen 650.

When the fluorescence is emitted from the specimen 650 onto which the condensed light spot is projected, the fluorescent light (the backward light) is passed through the objective optical system and then deflected in the reverse manner to the projected light thereby converting it into a light beam along the optical axis.

Since the objective optical system has the chromatic aberration of magnification, however, the focal length of the objective optical system with respect to the excitation light wavelength differs from its focal length with respect to the fluorescent light wavelength so that the incident angle (broken line .optical paths) of the fluorescent light to the light deflecting elements 631 and 633 differs from the exit angle (solid line optical paths) of the excitation light beam emitted from the light deflecting elements 631 and 633.

As a result, the backward light (fluorescence) deflected by the light deflecting elements 631 and 633 and directed to the condensing lens is passed as a light beam forming a certain angle which is not 0 with respect to the optical axis through the dichroic mirror 620 and it is entered into a condensing lens group 661 within the detection system.

Since the condensing lens group 661 is arranged so that the light beam incident along the optical axis is condensed at the position of the pinhole formed in the light shielding member, the backward light (fluorescence) incident on the condensing light group 661 is condensed at a position deviated from the pinhole center.

Here, if F represents the focal length of the objective optical system 640 at the wavelength of the excitation light, G the focal length of the objective optical system 640 at the wavelength of the backward light (here the fluorescence), H the focal length of the condensing lens group 661 at the backward light wavelength, $\alpha$ the beam deflection angle of the light deflecting elements 631 and 633, $\beta$ the angle formed by the excitation light and the optical axis, $\gamma$ the angle formed by the backward light and the optical axis, and tan $\theta$ is approximated by $\theta$, the distance U between the backward light spot center on the light shielding member and the pinhole center positioned on the optical axis can be expressed by the following equation (4).

$$U = H(\beta - \gamma) = \{1 - (F/G)\} H\alpha \tag{4}$$

As will be seen from this equation (4), the amount of movement U of the backward light spot on the light shielding member due to the chromatic aberration of magnification is increased with increase in the deflection angle $\alpha$ of the light deflecting elements, that is, the amount of movement U is increased as the scanning portion (the projected position of the condensed light spot) is moved toward the peripheral portion of the specimen.

Therefore, as the scanning point (projection position) of the condensed light spot is moved into the peripheral portion of the specimen, the percentage of the detection light or the backward light (fluorescence) intercepted by the light shielding member is increased and only a part of the light reaches the detection system. As a result, the image obtained from such detection signal involves the occurrence of a circular shading causing the central portion of the specimen to become bright in circular form and the peripheral portion to become dark as shown in FIG. 11b.

While the description has been made of the case assuming only the presence of the chromatic aberration of magnification in the objective optical system, such shading as mentioned above is not limited to cases where there is the chromatic aberration of magnification in the objective optical system and it also occurs in cases where there is the axial chromatic aberration.

Figure 12A:
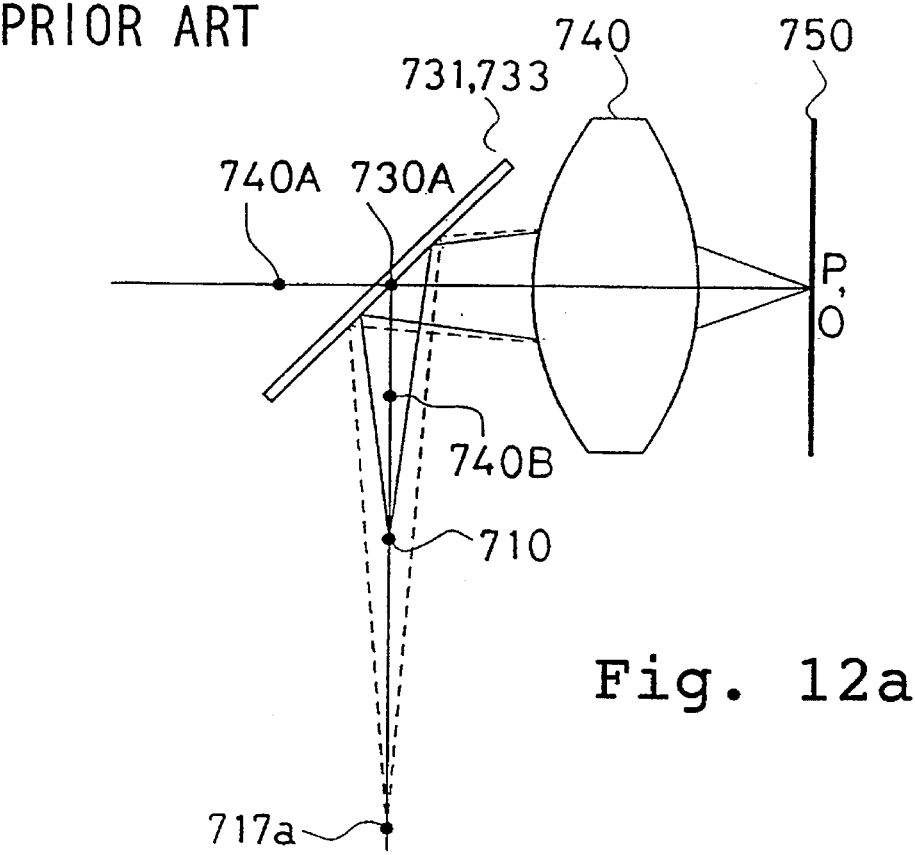
FIG. 12a is an optical path diagram showing the condensing principle of the excitation light and the backward light (fluorescence) in the case of the scanning-type confocal microscope in which the objective optical system has only an axial chromatic aberration and the deflection angle θ the deflecting optical system is θ=0.
Figure 12B:
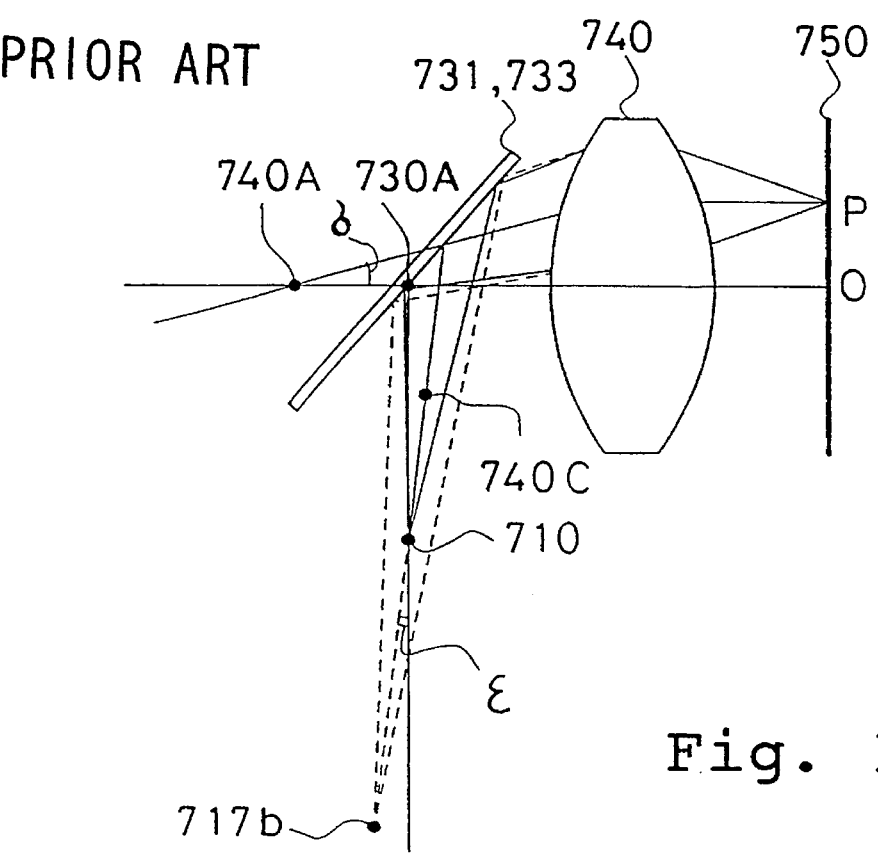
FIG. 12b is an optical path diagram showing similarly the condensing principle of the excitation light and the backward light (fluorescence) when θ≠0.

FIGS. 12a and 12b show the principle of condensing the excitation light and the fluorescence in cases where an objective optical system shows an axial chromatic aberration. Here, for purposes of simplifying the explanation, let us assume the case where the objective optical system shows no chromatic aberration of magnification and there is only the axial chromatic aberration. Also, as in the previously mentioned case, actually the deflecting optical system includes two light deflecting elements but they are represented as the single member in the Figures.

In FIGS. 12a and 12b, the solid lines indicate the excitation light (laser beam) and the broken lines indicate the backward light (fluorescence), with the excitation light emitted from a light source unit being represented as one emitted from a point source of light. In this case, the objective optical system shows no chromatic aberration of magnification so that while the focal length due to the excitation light wavelength and the focal length due to the fluorescent light wavelength are not different, due to the presence of the axial chromatic aberration, the focal point of the excitation light and the focal point of the fluorescent light on the light deflecting element side do not coincide and are in alignment with each other.

Generally, in the plane where a specimen is present, the distance PO between the condensing point position P of the excitation light and the optical axis position O can be easily calculated by use of an expression $y = f \ast \tan \varnothing$ in accordance with the focal length of the objective optical system due to the excitation light wavelength and the angle S formed by the light beam emitted from the point source and passing through the position conjugate to the light deflecting element-side focal point of the objective optical system and the optical axis.

FIG. 12a shows the manner in which the excitation light and the backward light are condensed when the deflection angle of light deflecting elements 731 and 733 is zero. The excitation light emitted from a point source 710 on the optical axis is reflected by the light deflecting elements 731 and 733, entered into an objective optical system 740 and condensed on a specimen 750, thereby forming a light spot.

In this case, due to the fact that the deflection angle of the light deflecting elements 731 and 733 is zero, a point 740B, which is conjugate to a light deflecting element-side focal point 740A of the objective optical system 740, is on the optical axis and the angle formed by the light ray emitted from the point source 710 and passing through the point 740B and the optical axis is also zero (the ray travels along the optical axis). Therefore, the distance between the condensing point position P and the optical axis position O on the specimen 750 is zero irrespective of the focal length of the objective optical system 740.

On the other hand, the backward light (fluorescence) emanated from the condensing point position (P) of the excitation light on the optical axis of the specimen 750, is passed through the objective optical system 740, reflected by the light deflecting elements 731 and 733 and condensed on a point 717a positioned on the optical axis passing through the point 740B.

In other words, when the deflection angle of the light deflecting elements is zero, the point 740B is on the optical axis and the angle formed by the principal ray of the backward light (fluorescence) emanating from the condensing point position (P) of the excitation light and passing through the point 740B and the optical axis is zero.

As a result, while the condensing point 717a of the backward light (fluorescence) is also positioned on the optical axis, due to the axial chromatic aberration of the objective optical system 740, there is no coincidence between the condensing point 717a of the backward light (fluorescence) having a different wavelength from the excitation light and the point source 710 and they are apart by a given distance in the optical axis direction.

On the other hand, FIG. 12b shows the manner in which the excitation light and the backward light are condensed when the deflection angle of the light deflecting elements 731 and 733 (the angle formed by the light ray emitted from the point source, passing through the intersection of the deflection plane of the light deflecting elements 731 and 733 and falling on the object optical system 740 and the optical axis) is θ (where θ≠0). Similarly as in the previously mentioned case, the excitation light emitted from the point source 710 on the optical axis is deflected (reflected) by the light deflecting elements 731 and 733, entered into the objective optical system 740 and then condensed at a position other than the optical axis on the specimen 750, thereby forming a light spot.

The backward light (fluorescence) emanated from the position of the condensing point of the excitation light formed on the specimen 750, is passed through the objective optical system 740, deflected (reflected) in the directions reverse to those of the excitation light by the light deflecting elements 731 and 733 and then condensed.

In this case, since it is assumed that the objective optical system has no chromatic aberration of magnification, the focal point of the excitation light and the focal point of the backward light (fluorescence) on the light deflecting optical system side are both on the same straight line passing through the point source 710 and the point 740B. Then, since the light deflecting elements 731 and 733 are arranged at a position 730A which is different from the focal position 740A of the objective optical system and the deflection angle of the light deflecting elements is not zero, a point 740C is positioned off the optical axis.

As a result, the principal ray of the excitation light and the principal ray of the backward light (fluorescence) on the light deflecting element side are inclined with an arbitrary angle (ξ) with respect to the optical axis and the point source 710 and the point 740C are on the principal ray inclined with respect to the optical axis, thus positioning a condensing point 717b of the backward light (fluorescence) off the optical axis.

As a result, even if the backward light condensed at the point 717b is condensed by the condensing lens group within the detection optical system, its condensing point also becomes one whose center is off the optical axis and a part of the backward light cannot be detected due to its interception by the other portion of the light shielding plate than the pinhole.

Then, while the variables used when calculating the distance between the condensing point position of the excitation light on the specimen and the optical axis position from the equation y=f*tan ø as mentioned previously are the focal length f of the objective optical system 740 due to the excitation light wavelength and the angle ø of the principal ray, the angle ø of the principal ray is not the deflection angle ø (the angle formed by the light ray emanating from the point source 710, passing through the intersection 730A of the reflection plane of the light deflecting elements 731 and 733 and the optical axis and entering the objective optical system 740 and the optical axis) but it is the angle δ formed by the light ray emitted from the point source 710, passing through the point 740C and entering the objective optical system 740 and the optical axis.

Thus, in the case of FIG. 12b where the deflection angle of the light deflecting elements 731 and 733 is θ, the light ray passing through the point 740C and the condensing point 717b of the backward light is inclined by the angle ξ with respect to the optical axis and the condensing point 717b of the backward light is deviated in the perpendicular direction from the optical axis. Also, due to the axial chromatic aberration of the objective optical system 740, the distance between the condensing point 717b of the backward light and the point source 710 in the optical axis direction is not zero.

Further, since the center of the pinhole formed in the light shielding member is set in alignment with the optical axis, when the deflection angle θ is θ≠0, the condensing point of the backward light condensed on the light shielding member is also deviated from the center of the pinhole of the light shielding member. It is a matter of course that if the deflection angle θ is varied, this deviation amount V is also varied.

On the other hand, if the distance between the light deflecting element and the focal point of the objective optical system with respect to the horizontal scanning direction and the distance between the light deflecting element and the focal point of the objective optical system with respect to the vertical direction are not the same, the horizontal deviation amount and the vertical deviation amount are also different from each other.

Thus, the rate of decrease in the amount of light reaching the detection system differs between the horizontal scanning period and the vertical scanning period of the specimen so that while the shape of the shading is circular when there is only the chromatic aberration of magnification, it becomes rectangular when there is only the axial chromatic aberration.

While, in FIGS. 12a and 12b, both the excitation light and the fluorescence (backward light) are indicated as light beams which converge on the side of the light deflecting elements 731 and 733, the foregoing description also holds in cases where the excitation light or the backward light is a collimated light beam or a divergent light beam.

FIG. 13a is a diagram showing the construction of the actual scanning-type fluorescent confocal microscope. In the Figure, while the axial chromatic aberration of an objective optical system 840 including an objective lens group 843 is corrected by an axial chromatic aberration corrector lens 813 disposed between a laser light source 811 and a dichroic mirror 820, light deflecting elements 831 and 833 are deviated from the pupil position. With this construction, when the deflection angle of the light deflecting elements 831 and 833 is changed for the scanning of a specimen 850, the position of the backward light spot on a light shielding plate 862 is moved.

FIG. 13b shows the corresponding fluorescent light spot 870 on the light shielding plate 862 as looked from the side of the condensing lens group 861. When the position of the fluorescent light spot 870 is moved so that it is deviated from a pinhole 862B of the light shielding plate 862, the amount of light reaching a photodetector is decreased thus causing a shading.

In the case of the focal point relay arrangement system such as mentioned previously with reference to FIG. 5, the two light deflecting elements 831 and 833 are at the light deflecting element-side focal position of the objective optical system 840. As a result, while the distance between the position of the light deflecting elements 831 and 833 and the light deflecting element-side focal position of the objective optical system is small so that the position of the fluorescent light spot on the light shielding plate 862 changes less and the resulting shading is not conspicuous, the position of the fluorescent light spot is moved slightly in response to variation in the deflection angle of the light deflecting elements 831 and 833.

On the other hand, in the case of the focal point adjoining arrangement system such as described with reference to FIG. 6, the distance between the horizontal position of the light deflecting elements 831 and 833 and the light deflecting element-side focal position of the objective optical system 840 differs from the distance between the vertical position of the light deflecting elements 831 and 833 and the light deflecting element-side focal position of the objective optical system 840. Thus, the amount of movement of the fluorescent light spot during the horizontal scanning period of the specimen 850 and the amount of movement of the fluorescent light spot during the vertical scanning period of the specimen are also different from each other.

Thus, since the rate of decrease in the amount of light reaching the photodetector 863 differs between the cases when the specimen 850 is scanned horizontally and when the specimen is scanned vertically, in the case of the conventional circular pinhole, the shape of the resulting shading becomes rectangular as mentioned previously.

In a confocal microscope according to a first embodiment of the present invention, in order to obtain an image free of shading such as described hereinabove, a light shielding member is provided with a pinhole of a size that covers a range of movement for the position of the condensing point of the backward light caused in response to the movement of the optical path by light deflecting elements.

Thus, even if the position of the fluorescent light spot condensed at the position conjugate to the condensing point on the specimen is shifted from the center of the optical axis, there is no danger of the fluorescent light spot being intercepted by the light shielding member even partly so that it is possible to obtain an excellent observation image without the occurrence of any shading due to decrease in the amount of detection light. Therefore, it is possible to make a highly accurate ion quantitative determination on the basis of the fluorescence.

Further, the amount of allowance for the axial chromatic aberration and the chromatic aberration of magnification is increased and this has the effect of simplifying the designing of an objective lens for a scanning confocal microscope.

Preferably, the pinhole can be formed into a slit shape so as to further reduce the substantial opening area of the pinhole, thereby preventing the occurrence of shading and further enhancing the resolution along the optical axis direction.

Then, where the objective optical system has no chromatic aberration of magnification and there is only the axial chromatic aberration, the amount of movement V from the optical axis on the light shielding member of the center of the backward light spot moved for the scanning of the specimen can be given by the following equation (5)

$$V = \frac{(\{1-(N/L)\} - \{1-(M/K)\}H\alpha}{\{1-(N/L)+(S/L)\}} \quad (5)$$

Here, in equation (5) represented by L is the distance between the light deflecting element-side focal plane of the objective optical system due to the backward light (fluorescence) wave-length and the conjugate plane to the specimen plane (the distance is positive when the conjugate plane is on the opposite side to the objective optical system with respect to the focal plane and negative when on the same side), K the distance between the light deflecting element-side focal plane of the objective optical system due to the excitation light wavelength and the conjugate plane to the specimen plane (the distance is positive when the conjugate plane is on the opposite side to the objective optical system with respect to the focal plane and negative when on the same side), N the distance between the light deflecting element-side focal point of the objective optical system due to the backward light wavelength and the deflection plane position of the light deflecting elements on the optical axis (the distance is positive when the deflection plane position on the optical axis is on the opposite side to the objective optical system with respect to the focal point and negative when on the same side), M the distance between the light deflecting element-side focal point of the objective optical system due to the excitation light wavelength and the deflection plane position of the light deflecting elements on the optical axis, S the distance between the light deflecting element-side focal point of the condensing lens group and the deflection plane position of the light deflecting elements on the optical axis (the distance is positive when the deflection plane position on the optical axis is on the opposite side to the objective optical system with respect to the focal point and negative when on the same side), H the focal length of the condensing lens group at the backward light wavelength, and α the beam deflection angle of the light deflecting elements.

Since both the chromatic aberration of magnification and the axial chromatic aberration are present in the objective optical system used actually, the amount of movement W of the backward light spot on the light shielding plate can be given by the following equation (6) from equations (4) and (5)

$$W = \frac{(\{1-(N/L)\} - (F/G)\{1-(M/K)\}H\alpha}{\{1-(N/L)+(S/L)\}} \quad (6)$$

Thus, in accordance with a preferred modification of the first embodiment, the opening length P of the pinhole with respect to the deflecting directions of the light deflecting elements is determined so as to assume a value greater than the amount of movement W of the backward light spot.

In other words, in this case, with respect to the deflecting directions of the light deflecting elements, the opening length P of the pinhole provided on the light shielding member is selected to satisfy the following equation (7)

$$P \geq \left| \frac{(\{1-(N/L)\} - (F/G)\{1-(M/K)\}H\alpha}{\{1-(N/L)+(S/L)\}} \right| = W \quad (7)$$

In this case, even if the condensed light spot of the backward light in the detection system is moved in response to the movement of the condensed light spot on the specimen due to the action of the light deflecting elements, all the backward light condensed on the light shielding member is allowed to pass through the pinhole and therefore the backward light can be always detected properly irrespective of the scanning position on the specimen. As a result, there is the occurrence of no shading due to the aberrations of the objective optical system in the resulting observation image.

Also, with increase in the opening length P of the pinhole with respect to the deflecting directions of the light deflecting elements, the amount of light detected in the peripheral portion of the visual field is correspondingly increased thus producing a bright observation image. While the resolution along the optical axis direction decreases with an increase in the opening length P of the pinhole, if it is desired to ensure the light quantity despite the decreased resolution along the optical axis direction, the length P of the pinhole with respect to the deflecting directions of the light deflecting elements can be increased up to such extent that the desired light quantity is obtained.

However, generally the decreased resolution along the optical axis direction is not desirable so that in accordance with a still another preferred modification of the first embodiment, the opening length P of the pinhole with respect to the deflecting directions of the light deflecting elements is determined so as to satisfy the following equation (8)

$$P \leq \left| \frac{(\{1-(N/L)\} - (F/G)\{1-(M/K)\}H\alpha}{\{1-(N/L)+(S/L)\}} \right| + D = W + D \quad (8)$$

Here, represented by D is the Airy disc diameter of the fluorescence on the light shielding member and this Airy disc diameter D of the fluorescence on the light shielding member is defined as $D=1.22 \lambda/NA$ in accordance with the wavelength $\lambda$ of the fluorescence and the light shielding member-side numerical aperture NA of the condensing lens.

In other words, in accordance with the still further preferred modification of the first embodiment, the opening length P of the pinhole with respect to the deflecting directions of the light deflecting elements is determined so that not only does it have a value greater than the amount of movement W of the backward light spot, but also the value is smaller than the value obtained by adding together the amount of movement W of the backward light spot and the Airy disc diameter D of the backward light on the light shielding member.

By thus setting the opening length P of the pinhole to the value obtained by adding together the amount of movement W of the backward light spot and the Airy disc diameter D of the backward light on the light shielding member, the large part of the backward light is allowed to pass through the pinhole even if the backward light spot is remotest from the optical axis so that not only the light quantity reaching the detection system is not decreased, but also the resolution along the optical axis direction is not deteriorated. Thus, an excellent image free of shading can be obtained.

It is to be noted that the above-mentioned shading due to the axial chromatic aberration and the chromatic aberration of magnification is not limited to the fluorescence in the backward light so that as in the case of Raman scattered light or the like, there is the possibility of occurrence of shading in cases where the wavelength of the light from the light source and the wavelength of the light emitted from the specimen are different from each other. The first embodiment of the present invention and some modifications are each capable of producing a satisfactory effect in preventing the occurrence of shading in cases where the backward light different in wavelength from the projected wavelength is detected.

Figure 1A:
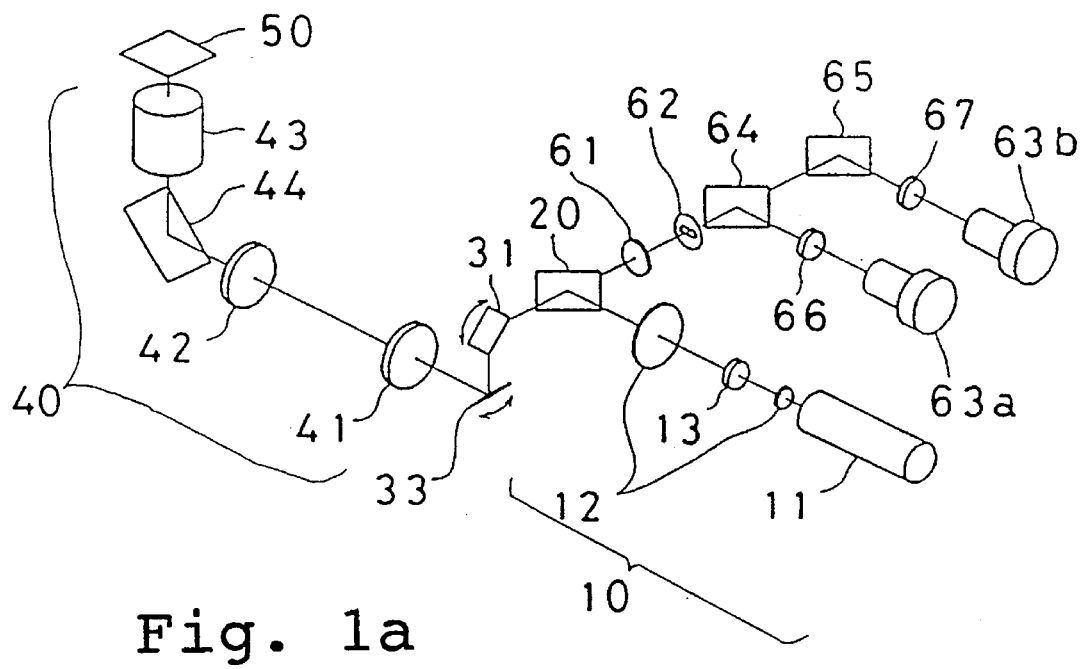
FIG. 1a shows schematically the construction of a confocal microscope according first embodiment of the present invention.
Figure 1B:
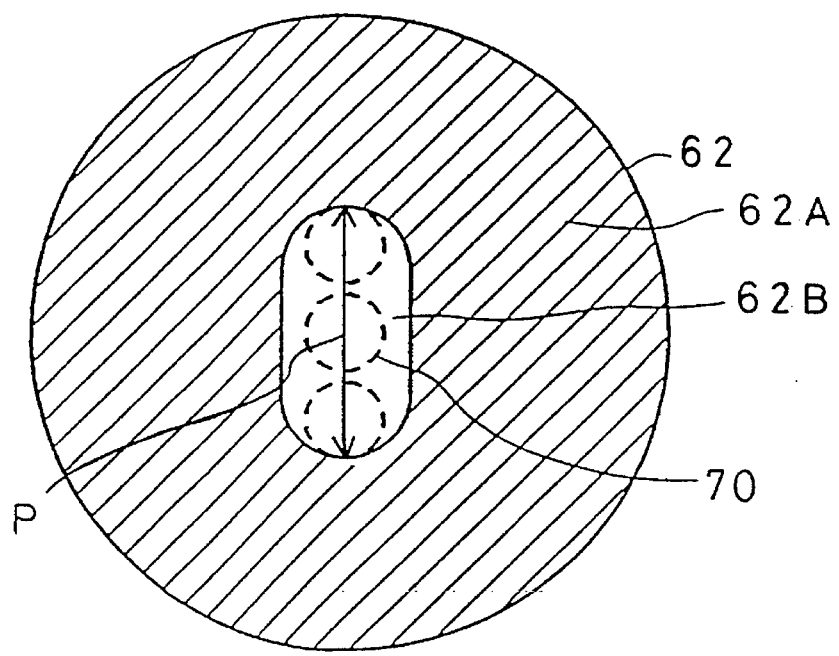
FIG. 1b shows the positional relation between the light shielding plate with a pinhole and the backward light (fluorescence) spot as looked from the objective lens group side.

FIGS. 1a and 1b show schematically the construction of a scanning-type fluorescent confocal microscope according to the first embodiment of the present invention. In this first embodiment, the axial chromatic aberration and the chromatic aberration of magnification of its objective optical system are of about the same degrees as those of the objective optical system used in the conventional confocal microscope and particularly not special correction is provided for.

The purpose of this embodiment is to prepare a cardiac expansion cell of a rat as a specimen and thereby to observe the calcium ions within the cell. The fluorescent reagent INDO-1 (tradename) is used for the purpose of observing the calcium ions within the cell. This INDO-1 is such that when excited by ultraviolet light, fluorescent light of two wavelengths are produced and their ratio of light quantities varies with the amount of the calcium ions. These two fluorescent wavelengths are 405 nm and 485 nm and the amount of calcium ions can be determined from the light quantity ratio between the fluorescent light of the two different wavelengths.

With this embodiment, the focal distance F of the objective optical system due to the laser light wavelength from a light source is −0.973 mm, the focal length G of the objective optical system due to the wavelength of the fluorescence or backward light to be detected is −0.971 mm, the distance L between the light deflecting element-side focal plane of the objective optical system due to the fluorescent wavelength and the conjugate plane to the specimen plane is −5290 mm, the distance K between the light deflecting element-side focal plane of the objective optical system due to the laser light wavelength and the conjugate plane to the specimen plane is −500 mm, the distance N between the light deflecting element-side focal point of the objective optical system due to the fluorescence wavelength and the deflection plane position of the light deflecting elements on the optical axis is 2.27 mm, the distance M between the light deflecting element-side focal point of the objective optical system due to the laser light wavelength and the deflection plane position of the light deflecting elements on the optical axis is 2.31 mm, the distance S between the light deflecting element-side focal point of a condensing lens group and the deflection plane position of the light deflecting elements on the optical axis is 1580 mm, the focal length H of the condensing lens group due to the fluorescent wavelength is 381 mm, the beam deflection angle $\alpha$ of the light deflecting elements is 0.182 radians and the Airy disc diameter D on a light shielding plate is 0.127; in accordance with these values the opening length P of the pinhole with respect to the deflecting directions of the light deflecting elements is determined as P=0.746 mm from the previously mentioned equation (2) and the pinhole 62B of such length is formed in the light shielding plate 62.

Also, in this embodiment an ultraviolet argon (Ar) laser of the water-cooled type is used as a light source and the laser beam having a wavelength of 351 nm is emitted from the light source for use as an excitation light.

In FIGS. 1a and 1b, the laser beam from the laser light source 11 of the light source unit 10 is passed through a beam expander 12 and a corrector lens group 13 for the axial chromatic aberration of the objective optical system and entered into a dichroic mirror 20.

The dichroic mirror 20 serves the role of optical path dividing means and it is reflective to the wavelength of the laser beam emitted from the laser light source 11 and transparent to light of the other wavelengths. The laser beam incident on the dichroic mirror 20 is reflected by it to fall on a vertical scanning light deflector 31 and a horizontal scanning light deflector 33 each employing a galvanometer mirror.

The vertical light deflector 31 and the horizontal deflector 33 are provided to deflect the incident laser beam in the vertical scanning direction and the horizontal scanning direction and determine the projection position of the excitation light which is subsequently projected on a specimen whereby the optical path of the laser beam incident on the vertical deflector 31 and the horizontal deflector 33 is deflected in the horizontal scanning direction and the vertical scanning direction, respectively, so that the laser beam is transmitted to an objective optical system 40 and through a relay lens group 41 and a focus projection lens group 42, reflected by an optical path bending mirror 44 to fall on an objective lens group 43 and condensed into a spot form on a specimen 50.

The laser beam condensed into a spot form on the specimen 50 two-dimensionally scans over the specimen 50 in response to changes in the deflection angle of the vertical deflector 31 and the horizontal deflector 33. At this time, the fluorescent light of the previously mentioned two kinds are produced from the portion of the specimen 50 illuminated by the laser light spot.

In the order reverse to that of the excitation light, the fluorescence (backward light) emitted from the specimen 50 is transmitted through the objective lens group 43, the optical path bending mirror 44, the focus projection lens group 42 and the relay lens group 41, entered into the horizontal deflector 33 and the vertical deflector 31 and converted into a light beam substantially parallel to the optical axis.

In this condition, the fluorescent light returning from the specimen 50 is first transmitted through the dichroic mirror 20 and it is separated from the other backward light components (the reflected laser light, etc.,); thereafter, the fluorescent light is entered into the condensing lens group 61 and condensed on the light shielding plate 62.

As mentioned previously, in this embodiment the shape of the pinhole 62B with respect to the deflecting directions of the vertical deflector 31 and the horizontal deflector 33 is formed into a slit shape having a lengthwise dimension P=0.746 mm. This situation is shown in FIG. 1b.

As will be seen from FIG. 1b, even if the fluorescent light spot 70 is moved on the light shielding plate 62 so that it is at the position remotest from the optical axis, the large part of the spot can pass through the pinhole 62B. Thus, not only the amount of light reaching photodetectors 63a and 63b is not decreased, but also the length P of the pinhole becomes one obtained by adding the diameter D of the Airy disc of the fluorescence on the light shielding plate to the amount of movement W of the condensing point of the fluorescence on the light shielding plate, thereby preventing the resolution along the optical axis direction from being deteriorated undesirably.

The fluorescence passed through the pinhole 62B of the light shielding plate 62 is entered into a second dichroic mirror 64 for fluorescence spectroscopic purposes and separated according to the respective wavelength regions. In this case, the fluorescent light reflected by the second fluorescence spectroscopic dichroic mirror 64 and the fluorescent light passed through the dichroic mirror 64 and reflected by the optical path bending mirror 65 are respectively entered into barrier filters 66 and 67.

After the trace amounts of the remaining excitation light and the fluorescence of the different wavelength components have been removed, the fluorescent light entered into the barrier filters 66 and 67 are respectively entered into the photodetectors 63a and 63b and are detected as the fluorescent components of the respective wavelength regions.

The resulting detection signals from the photodetectors 63a and 63b are sent to an information processing computer where the light quantity ratio of the fluorescent light of the two different wavelengths is calculated and also an image processing is performed. As the result of these processings, the amount of calcium ions in the specimen 50 is calculated and also an observation image of the inspection surface is displayed on a video screen.

The fluorescent light emanated from the specimen 50 illuminated by the laser spot is detected without being intercepted by the light shielding portion 62A of the light shielding member 62 irrespective of the emanating position on the specimen 50. Thus, a clear observation image having no shading can be obtained when the image processing is performed by the system in accordance with the resulting detection signals and also the distribution of calcium ions in the living matter can be quantitatively measured with a very high degree of accuracy in accordance with the ratio between the fluorescent light quantities of the two different wavelengths.

Next, a confocal microscope according to a second embodiment of the present invention will be described with reference to FIGS. 2 and 3.

As mentioned previously, where an objective optical system has an axial chromatic aberration and a chromatic aberration of magnification, the amount of movement W of a backward light spot is expressed by equation (6). Then, the shading caused by the deflecting action of light deflecting elements can be eliminated when the amount of movement W is made W=0. Also, in order to prevent the occurrence of shading irrespective of the deflection angle of the light deflecting elements, it is only necessary to employ such arrangement of the optical elements which makes the amount of movement W to be W=0 irrespective of the magnitude of the deflection angle α.

While, in the previously described first embodiment, the occurrence of shading is prevented by virtue of the pinhole shape of the light shielding member, in accordance with the second embodiment, even if the pinhole remains as previously, it is possible to obtain an observation image which is free of shading irrespective of the magnitude of the deflection angle of the light deflecting elements by arranging the light deflecting elements at such positions that satisfy the following equation (9) derived from equation (6)

$$\{1-(N/L)\}-(F/G)\{1-(M/K)\}=0 \quad (9)$$

Here, while the variables G, F, L, K, N and M are determined by the lenses used in an objective optical system, the values themselves of the variables N and M can be varied by displacing the positions of the light deflecting elements in the optical axis direction.

Now assuming that N−M=Δ, the light deflecting elements are positioned in such a manner that the following equation (10) is satisfied by the distance N between the deflecting optical system-side focal position of the objective optical system due to the backward light wavelength or the position conjugate to this focal position and the deflection plane position of the light deflecting elements on the optical axis $$N = \frac{G - F\{1+(\Delta/K)\}}{(G/L) - (F/K)} \quad (10)$$

At this time, the amount of movement W of the backward light spot derived from equations (10) and (6) is given by the following equation (11)

$$W = \frac{(\{1-(N/L)\} - (F/G)\{1-(M/K)\})H\alpha}{\{1-(N/L)+(S/L)\}} = 0 \quad (11)$$

As is clear from equation (11), it will be seen that if equation (10) is satisfied, the amount of movement W of the backward light (fluorescent light) spot is always zero irrespective of the magnitude of the deflection angle α.

Thus, a confocal microscope is constructed having excellent examination characteristics in that even if the condensed light spot is moved on the specimen due to the action of the light deflecting elements, the condensed light spot of the backward light in the detection system always coincides with the pinhole position on the light shielding plate so that the backward light is always detected properly irrespective of the scanning position on the specimen and no shading or the like is caused in the resulting observation image.

Also, in this case the excitation light and the backward light are not..limited to the light beams which converge on the light deflecting element side and they may be collimated light or divergent light.

In the second embodiment, when arranging the plurality of light deflecting elements, they are each positioned so as to satisfy the above-mentioned condition. In other words, where the deflecting optical system is constructed so that the deflection of the light beam for horizontal scanning and the deflection of the light beam for vertical scanning are respectively effected by the separate light deflecting elements, the positioning of the respective deflecting elements is effected so as to satisfy the above-mentioned equation (10).

If the light deflecting elements are placed in such positions, irrespective of the direction of the deflection with respect to the deflection angle α, the backward light spot in the detection system is formed at the pinhole position of the light shielding member without being subjected to any effect at all on its forming position.

Thus, at any position apart from that corresponding to the optical axis on the specimen, the pinhole center and the condensed light spot center can be brought into coincidence with greater accuracy so that when, for example, a measurement such as an ion quantitative determination based on the backward light (fluorescence) is effected, a sufficiently high accuracy can be generally ensured within the resulting observation image.

Further, in accordance with a preferred modification of the second embodiment, displacement mechanisms for variably moving the position of the light deflecting elements can be further included. By so doing, the amount of displacement (the distance N) conforming with the wavelength to be detected can be adjusted as desired.

In other words, the confocal microscope according to the present embodiment embraces one including displacement mechanisms for moving the light deflecting elements in the optical axis direction to adjust the position of the backward light spot in the detection system.

Since the positions of the light deflecting elements are suitably set in conformity with the wavelength to be detected, there are the suitable first positions corresponding to the first wavelength to be detected. When detecting a second wavelength different from the first wavelength in this same microscope, the light deflecting elements must be placed in the suitable second positions corresponding to the second wavelength.

In such a case, it is only necessary to move the light deflecting elements into alignment with the second positions by the displacement mechanisms of this embodiment. When effecting such movements, while it is preferable to move the elements into the positions corresponding to a predetermined wavelength to be detected, the mechanisms can be constructed to effect the displacement continuously thereby effecting the displacements while adjusting in accordance with the observation conditions.

The provision of these displacement mechanisms is particularly effective in cases where it is desired to observe the reaction of fluorescent light of a wavelength differing in dependence on the kind of a fluorescent substance included in a specimen and also fine adjustments, etc., of the apparatus can be effected by moving the positions of the light deflecting elements as desired by the user, thus ensuring the advantage of producing more observation image.

Figure 2:
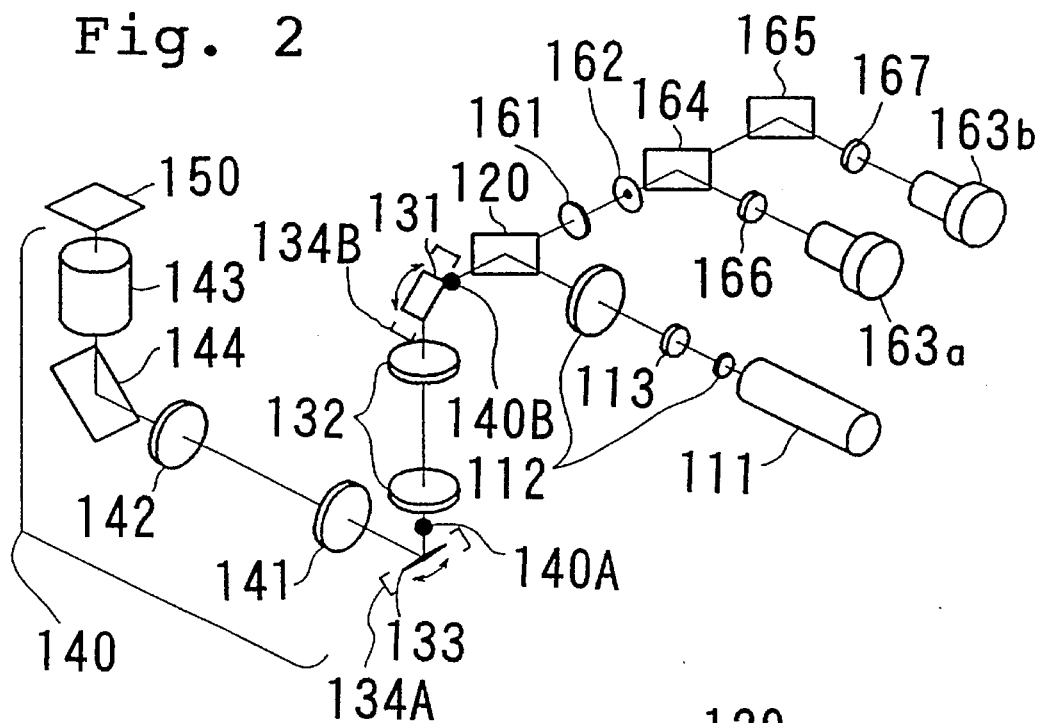
FIG. 2 shows schematically the construction of a confocal microscope according to a second embodiment of the present invention.

FIG. 2 shows schematically the construction of scanning-type fluorescent confocal microscope according to the second embodiment of the present invention. In this case, the axial chromatic aberration and the chromatic aberration of magnification of its objective optical system are on the order of those of the objective optical system used in the conventional confocal microscope, thus providing no particular correction.

It is also the object of the present embodiment to prepare the cardiac expansion cell of a rat as a specimen and observe the calcium ions in the cell. In order to observe the calcium ions in the cell, the same fluorescent reagent INDO-1 (tradename) as in the case of the first embodiment is used. When excited by ultraviolet light, this INDO-1 produces fluorescent light of two different wavelengths whose light quantity ratio is varied by the amount of calcium ions and these two fluorescent wavelengths are 405 nm and 485 nm, thus making it possible to determine the amount of calcium ions in accordance with the ratio between the light quantities of the fluorescent light of the two different wavelengths.

Assuming that the light deflecting optical system-side focal position of an objective optical system 140 is represented as a point 140A and the position conjugate to the point 140A is represented by 140B (hereinafter referred to as a relay focal position), in accordance with the present embodiment the positioning of two optical path deflectors 131 and 133 is effected so as to satisfy the previously mentioned equation (9).

In the present embodiment, the focal length F of the objective optical system due to the laser beam wavelength from a light source is set to −5.001 mm, the focal length G of the objective optical system due to the backward light to −5.000 mm, the distance K between the deflecting optical system-side object point and focal point of the objective optical system due to the laser beam wavelength to 1000 mm, the distance L between the deflecting optical system-side object point and focal point of the objective optical system due to the backward light to ∞, and $\Delta(=N-M)$ to −0.050 mm.

In accordance with the above-mentioned equation (10), the distance N along the optical axis between the deflection plane position of the light deflecting elements on the optical axis and the focal position of the objective optical system or the position conjugate to the focal point is 0.150 mm.

Also, in the second embodiment a water-cooled ultraviolet argon (Ar) laser is used as a light source and the laser beam having a wavelength of 351 nm emitted from the light source is used as an excitation light.

In FIG. 2, the laser beam emitted from the laser light source 111 is passed through a beam expander 112 and a corrector lens 113 for the axial chromatic aberration of an objective optical system and it is then reflected by a beam splitter 120 composed of a dichroic mirror.

The laser beam reflected by the beam splitter 120 is entered into a deflecting optical system 130 (FIG. 3) and, more specifically, into a vertical scanning light deflector 131 composed of a galvanometer mirror for deflecting the laser beam in the vertical scanning direction. Then, the laser beam is entered through a relay optical system 132 into a horizontal scanning light deflector 133 which is similarly composed of a galvanometer mirror whereby deflecting it in the horizontal scanning direction.

After the optical path has been deflected by this deflecting optical system, the laser beam is transmitted through a relay lens 141 and a focus projection lens 142 of the objective optical system 140, reflected by an optical path bending mirror 144, entered into an objective lens 143 and condensed into the form of a spot on a specimen 150.

After it has been condensed into the form of a spot on the specimen 150, the laser beam scans two-dimensionally over the specimen 150 in accordance with the changes in the deflection angle of the vertical deflector 131 and the horizontal deflector 133. At this time, the previously mentioned two kinds of fluorescent light are produced from the portion illuminated by the laser light spot on the specimen 150.

The fluorescent light (backward light) emitted from the specimen 150 is passed in the reverse order to that of the excitation light (laser beam) through the objective lens 143, the optical path bending mirror 144, the focus projection lens 142 and the relay lens 141, entered into the horizontal deflector 133, the relay optical system 132 and the vertical deflector 131 and converted into a light beam substantially parallel to the optical axis.

In this condition, the fluorescent light returned from the specimen 150 is passed through the dichroic mirror 120 so that it is separated from other backward light components (the reflected laser beam, etc.,) and entered into a condensing lens 161 which in turn condenses it on a light shielding plate 162.

In the present embodiment, as mentioned previously, the positioning of the two light deflectors 131 and 133 is effected so as to satisfy equation (9) and therefore the condensing point of the condensed light spot condensed on the light shielding plate 162 coincides with the pinhole center of the light shielding plate 162.

The fluorescent light passed through the pinhole of the light shielding plate 162 is entered into a second dichroic mirror 164 for fluorescent spectroscopic purposes and separated according to the respective wavelength regions. In this case, the fluorescent light reflected by the fluorescent spectroscopic dichroic mirror 164 and the fluorescent light passed through the dichroic mirror 164 and reflected by an optical path bending mirror 165 are respectively entered into barrier filters 166 and 167.

Trace amounts of noise light of the wavelength components differing from the excitation light component and remaining in the fluorescent light are removed by the barrier filters 166 and 167 and the resulting two kinds of fluorescent light are respectively entered into photodetectors 163a and 163b thereby detecting these fluorescent light as fluorescent components of the different wavelength regions.

The detection signals from the photodetectors 163a and 163b are sent to an information processing computer which is not shown so that the light quantity ratio of the fluorescent light of the two different wavelengths is calculated and also an image processing is performed. As a result of these processings, the amount of calcium ions in the specimen 150 is calculated and also an observation image of the inspection surface is displayed on a video screen.

While, in the present embodiment, the fluorescent light of the two wavelengths is detected, the fluorescent light is visible light so that the axial chromatic aberration and the chromatic aberration of magnification between the visible light of the two wavelengths are extremely small as compared with the axial chromatic aberration and the chromatic aberration of magnification between the excitation light wavelength of the ultraviolet region and the fluorescent wavelength of the visible region. As a result, the fluorescent light of the two different wavelengths is condensed at substantially the same position on the light shielding plate 162.

Thus, when determining the positions of the two light deflectors 131 and 133, it is only necessary to adjust to one or the other of the fluorescent wavelengths or the wavelength intermediary between the two wavelengths to satisfy the previously mentioned equation (9) and thereby to determine the adjusted positions.

Figure 3:
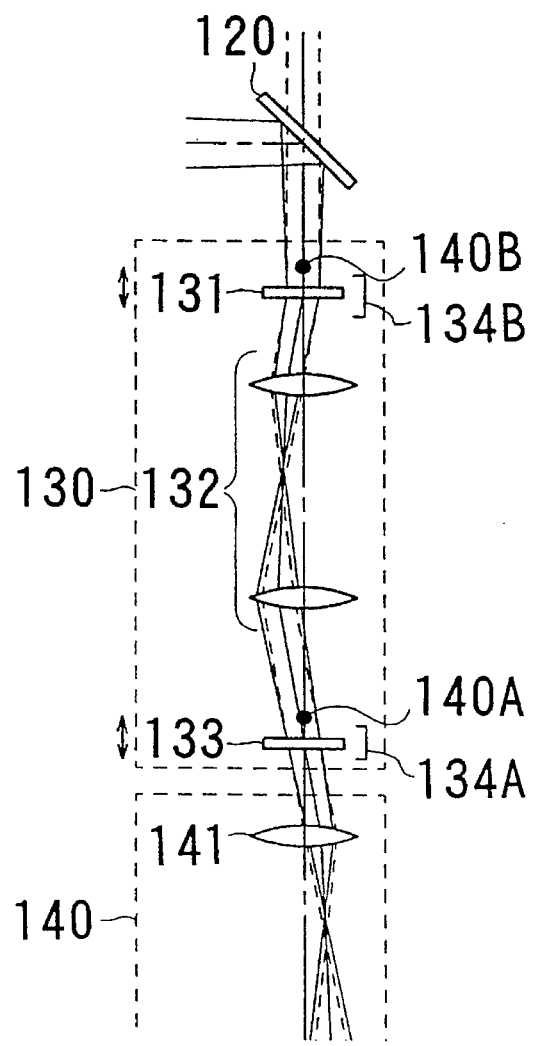
FIG. 3 shows schematically the construction of the light deflecting unit employed in the deflecting optical system of the second embodiment.

Also, as shown in FIGS. 2 and 3, the vertical deflector 131 and the horizontal deflector 133 of this embodiment are respectively provided with displacement mechanisms 134B and 134A so that the position of each deflector is moved to adjust the amount of displacement from the so-called relay focus arrangement.

The displacement mechanisms 134A and 134B are capable of making fine adjustments to the arranged positions of the deflectors and aligning the deflectors with the proper positions corresponding to the kinds (different wavelengths) of the fluorescent light.

Where there are two kinds of fluorescent light to be detected as in the case of this embodiment, with the light deflectors being positioned in conformity with the respective wavelengths, it is possible to separately detect fluorescent light of different wavelengths. Also, where fluorescent light of different wavelengths is detected as in cases in which another fluorescent reagent is used or the measurement of another substance is effected, it is possible to effect the proper fluorescent light detection by selecting the positions of the light deflectors which correspond to the wavelengths to be detected.

Thus, due to the fact that in accordance with this embodiment the positions of the light deflectors 131 and 133 are displaced from the so-called relay focus arrangement positions in accordance with the fluorescent wavelengths to be detected, the backward light from the specimen 150 and the desired fluorescent light are accurately condensed on the pinhole of the light shielding plate 162 and moreover the backward light and the desired fluorescent light are always condensed so as to be in registration with the pinhole position irrespective of the scanning positions (the amounts of deflection by the deflectors 131 and 133) of the laser spot on the specimen 150.

As a result, irrespective of the position on the specimen 150, the fluorescent light produced from the specimen 150 illuminated by the laser spot is detected without being intercepted by the light shielding plate 162 so that not only a clear observation image free of shading is obtained when an image processing is performed by the system in accordance with the resulting detection signals, but also the distribution of calcium ions in the living matter can be quantitatively measured with an extremely high degree of accuracy in accordance with the ratio between the fluorescent light quantities of the two wavelengths.

Further, since the condensing position of the fluorescent components of the backward light can be adjusted, it is possible to effect the detection by a pinhole of the smallest size conformed with the condensed light spot system without considering any deviation of the condensing position on the light shielding plate (a pinhole of smaller size may be suffice if the light quantity is ignored). Thus, there is the advantage that the detection of fluorescent light can be effected even if a pinhole of a smaller diameter than previously utilized is used and thus it is possible to obtain an image which is greater in depth of focus and higher in resolution than previously.

While, in the above-described embodiments, the present invention has been described as applied to a confocal microscope with reference to cases in which the fluorescent light in a backward light from a specimen is detected, the present invention is not limited to the confocal microscope but is applicable, for example, to the detection of Raman scattered light, etc. The present invention is capable of producing satisfactory effects in any type of confocal microscope adapted for the detection of a backward light of a wavelength which is different from that of the projection light from a light source.

What is claimed is:

1. A confocal microscope for observing a specimen comprising:

a light source for producing an excitation light of a predetermined wavelength, a deflecting optical system for deflecting an optical path of said excitation light from said light source, an objective optical system for condensing the deflected excitation light on a specimen, a condensing lens group for condensing a backward light, passing from said specimen illuminated by said excitation light and through said objective optical system and said deflecting optical system, at a position conjugate to a condensing point on said specimen, a light shielding member including a pinhole aligned with a position of a condensing point of said backward light, said pinhole having an opening length and an opening width, the opening length being greater than said opening width, and a detection system for detecting said backward light through the pinhole of said light shielding member, the opening length of said pinhole of said light shielding member having a size covering a range of movements of the condensing point of said backward light caused by movement of said optical path by said deflecting optical system.

2. A confocal microscope according to claim 1, wherein said pinhole has a slit-like opening shape.

3. A confocal microscope for observing a specimen comprising:

a light source for producing an excitation light of a predetermined wavelength, a deflecting optical system including at least one light deflecting element for deflecting an optical path of said excitation light from said light source, an objective optical system for condensing the deflected excitation light on a specimen, a condensing lens group for condensing backward light, passing from said specimen illuminated by said excitation light and through said objective optical system and said deflecting optical system, at a position conjugate to condensing point on said specimen, a light shielding member having a pinhole aligned with a position of a condensing point of said backward light, and a detection system for detecting said backward light through the pinhole of said light shielding member, an opening length P of said pinhole with respect to the defecting direction of said light defecting element satisfying the following equation $$P \geq \left| \frac{(\{1-(N/L)\}-(F/G)\{1-(M/K)\})H\alpha}{\{1-(N/L)+(S/L)\}} \right|$$

where G is a focal length of the objective optical System due to the backward light wavelength, F is a focal length of the objective optical system due to the excitation light wavelength, L is a distance between a light deflecting element-side focal plane of the objective optical system due to the backward light wavelength and a conjugate plane to a specimen plane, K is a distance between a light deflecting element-side focal plane of the objective optical system due to the excitation light wavelength and the conjugate plane to the specimen plane, N is a distance between a light deflecting element-side focal point of the objective optical system due to the backward light wavelength and a deflection plane position of the light deflecting element on the optical axis, M is a distance between a light deflecting element-side focal point of the objective optical system due to the excitation light wavelength and the deflection plane position of the light deflecting element on the optical axis, S is the distance between a light deflecting element-side focal point of the condensing lens group and the deflection plane position of the light deflecting element on the optical axis, H is a focal length of the condensing lens group at the backward light wavelength, and α is a beam deflection angle of the light deflecting element, with L and K being positive when said conjugate plane is on an opposite side of said focal plane from the objective optical system and negative when on the same side of said focal plane as the objective optical system, and N, M and S being positive when the deflection plane position on the optical axis is on an opposite side of said focal point from the objective optical system and negative when on the same side of said focal point as the objective optical system.

4. A confocal microscope according to claim 3, wherein the opening length P of said pinhole, in the deflecting direction of said light deflecting element, further satisfies the following equation $$P \leq \left| \frac{(\{1-(N/L)\}-(F/G)\{1-(M/K)\})H\alpha}{\{1-(N/L)+(S/L)\}} \right| + D$$

where D is an Airy disc diameter of said backward light on said light shielding member.

5. A confocal microscope for observing a specimen comprising:

a light source for producing an excitation light of a predetermined wavelength, a deflecting optical system for deflecting an optical path of said excitation light from said light source, an objective optical system for condensing the deflected excitation light on a specimen, a condensing lens group for condensing backward light, passing from said specimen illuminated by said excitation light and through said objective optical system and said deflecting optical system, at a position conjugate to a condensing point on said specimen, a light shielding member having a pinhole aligned with a position of a condensing point of said backward light, and a detection system for detecting said backward light through the pinhole of said light shielding member, said deflecting optical system including at least one light deflecting element placed at a position displaced by a predetermined distance from a deflecting optical system-side focal position of said objective optical system or a position conjugate to said focal position, wherein a distance N between a light deflecting element-side focal point of said objective optical system due to the backward light wavelength or a conjugate point thereto and a deflection plane position of said light deflecting element on the optical axis satisfies the following equation $$N = \frac{G - F\{1+(\Delta/K)\}}{(G/L)-(F/K)}$$

where G is a focal length of the Objective optical system due to the backward light wavelength, F is a focal length of the objective optical system due to the excitation light wavelength, L is a distance between a light deflecting element-side focal plane of the objective optical system due to the backward light wavelength and a conjugate plane to a specimen plane, K is a distance between a light deflecting element-side focal plane of the objective optical system due to the excitation light wavelength and the conjugate plane to the Specimen plane, and Δ is a distance along the optical axis between the light deflecting element-side focal plane of the objective optical system due to the excitation light wavelength or a conjugate plane thereto and the light defecting element-side focal plane of the objective optical system due to the backward light wavelength or a conjugate plane thereto, with L and K being positive when said conjugate plane is on an opposite side of said focal plane from the objective optical system and negative when on the same side of said focal plane as the objective optical system, N being positive when the .deflection plane position on the optical axis is on an opposite side of said focal point or the conjugate point thereto and negative when on the same side as said focal point or the conjugate point thereto, and A being negative when the light deflecting element-side focal plane of the objective optical system due to the excitation light wavelength or the conjugate plane thereto is on the same side of the light deflecting element-side focal plane of the objective optical system due to the backward light wavelength or the conjugate plane thereto as the objective optical system and positive when on an opposite side of the light deflecting element-Side focal plane of the objective optical system due to the backward light wavelength or the conjugate plane thereto from the objective optical system.

6. A confocal microscope according to claim 5, wherein said deflecting optical system includes a first light deflecting element and a second light deflecting element.

7. A confocal microscope according to claim 5, wherein said deflecting optical system includes a displacement element for displacing said at least one light deflecting element along the optical axis.

* * * * *